(12) United States Patent
Kurita et al.

(10) Patent No.: US 6,561,322 B2
(45) Date of Patent: May 13, 2003

(54) PLATED WEAR SURFACE FOR ALLOY COMPONENTS AND METHODS OF MANUFACTURING THE SAME

(75) Inventors: Hirotaka Kurita, Shizuoka (JP); Hiroshi Yamagata, Shizuoka (JP); Toshikastu Koike, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 09/453,155

(22) Filed: Dec. 2, 1999

(65) Prior Publication Data

US 2002/0153210 A1 Oct. 24, 2002

(30) Foreign Application Priority Data

| Dec. 3, 1998 | (JP) | 10-344741 |
| Dec. 3, 1998 | (JP) | 10-344745 |
| Jul. 29, 1999 | (JP) | 11-215896 |

(51) Int. Cl.[7] .............................................. F16D 69/00

(52) U.S. Cl. ................................. 188/251 M; 428/624

(58) Field of Search ..................... 188/251 R, 251 M, 188/251 A; 428/624, 653, 687, 935, 613, 681, 469; 205/112, 113, 153, 196, 270, 255, 131; 399/276; 148/242

(56) References Cited

U.S. PATENT DOCUMENTS

| 3,144,359 | A | * | 8/1964 | Takahashi et al. | ........... 148/242 |
| 4,065,365 | A | * | 12/1977 | Ibarguengoitia | ............ 205/131 |
| 4,221,639 | A | * | 9/1980 | Ninagawa et al. | ........... 428/624 |
| 4,230,507 | A | * | 10/1980 | Obayashi et al. | ........... 148/242 |
| 4,388,379 | A | * | 6/1983 | Klingenmaier | ............... 428/613 |
| 4,525,759 | A | * | 6/1985 | Valayil et al. | ............... 205/112 |
| 4,846,940 | A | | 7/1989 | Neuhäuser et al. | |
| 5,187,017 | A | * | 2/1993 | Hatano et al. | ............... 428/469 |
| 6,139,973 | A | * | 10/2000 | Kawasaki et al. | ........... 428/469 |
| 6,149,790 | A | * | 11/2000 | Oikawa et al. | ............. 205/113 |
| 6,178,306 | B1 | * | 1/2001 | Mizoguchi et al. | ......... 399/276 |

FOREIGN PATENT DOCUMENTS

| DE | 24 16915 | 10/1975 |
| DE | 29 21 952 | 12/1980 |
| DE | 0152946 | * 12/1981 |
| DE | 195 20 880 | 6/1996 |
| DE | 196 53 210 | 6/1997 |
| DE | 196 08 952 | 9/1997 |
| EP | 0 892 088 | 1/1999 |

(List continued on next page.)

OTHER PUBLICATIONS

1987, Finishing Publications et al., Teddington, GB XP002176437, p. 1062 line 28 –p. 1062, line 6.

*Primary Examiner*—Christopher P. Schwartz
*Assistant Examiner*—Melanie Torres
(74) *Attorney, Agent, or Firm*—Knobbe, Martens, Olson & Bear, LLP

(57) ABSTRACT

An aluminum alloy brake disc body for a disc brake device is provided with a metal layer of a high wear-resistance. The high wear-resistance metal layer is configured to reduce thermal stresses within the aluminum alloy brake disc body so as to inhibit warping, bending or flexing of the brake disc when heated during braking. The high wear-resistant metal layer also is applied to the aluminum alloy brake disc body in a manner reducing manufacturing costs. In one mode, a plating layer made of a metal having a high wear-resistance is formed on a frictional surface of an aluminum alloy brake disc body. Cracks in the form of a fine network are formed in the whole area of the plating layer. The cracks can be formed by a plating process, by nitrosulphurization, by heating, by burnishing or by use of the plated component. The cracks advantageously provide for expansion between the individual metal fragments and, thus, create an expandable plated wear surface. Other aluminum components with wear surfaces can also be formed with a wear-resistant layer in a similar manner.

87 Claims, 17 Drawing Sheets

FOREIGN PATENT DOCUMENTS

| | | |
|---|---|---|
| FR | 2 549 090 | 1/1985 |
| GB | 1152100 | 5/1969 |
| GB | 1409059 | 10/1975 |
| GB | 2 154 614 | 9/1985 |
| JP | 59013092 A * | 1/1984 |
| JP | 01106909 | 4/1989 |
| JP | 01212765 | 8/1989 |
| JP | 02211308 | 8/1990 |
| JP | 5-26268 | 7/1991 |
| JP | 06323327 | 11/1994 |

* cited by examiner

PLATED WEAR SURFACE FOR ALLOY COMPONENTS AND METHODS OF MANUFACTURING THE SAME

PRIORITY INFORMATION

This application is based on and claims priority to Japanese Patent Application Nos. Hei 10-344,741, filed Dec. 3, 1998, Hei 10-344,745, filed Dec. 3, 1998, and Hei 11-215, 896, filed Jul. 19, 1999, the entire contents of which are hereby expressly incorporated by reference.

BACKGROUND OF THE INVENTION

1. Field of the Invention

The present invention generally relates to alloy components having wear surfaces and to methods of manufacturing such components. More particularly, the present invention relates to aluminum alloy components having expandable wear surfaces formed by plating.

2. Description of Related Art

Many components of vehicles are unnecessarily heavy. These components decrease fuel economy and can lead to premature aging of suspension components as well as to poor handling characteristics of the vehicle. Accordingly, decreasing the weight of vehicles has become a goal across all lines of vehicles.

Some examples of such components that have been reduced in weight are connecting rods, tappets and rocker arms of engines. A further example of such a component is a brake disc of a disc brake device mounted on vehicles such as automobiles and motorcycles. Specifically, there is a high demand for brake discs that have as light a weight as possible in order to improve both running performance and fuel consumption. One idea for achieving the decreasing the weight of the brake disc is to use an aluminum alloy for forming a plate-like part (hereinafter, the plate-like part will be called "brake disc body") which is to be fixed to a hub.

Because most aluminum alloys are relatively soft materials, when the brake disc body is formed of an aluminum alloy, an annular ring made of an iron-containing metal is typically bonded to a surface of the brake disc body to form a frictional surface. This metal increases the life of the brake disc by providing a harder wear surface for the brake disc. Such a brake disc is disclosed, for example, in JP-A-H5-26268.

The brake disc disclosed in the above publication includes a brake disc body formed of an aluminum alloy and having a front surface portion that a brake pad selectively engages. An annular ring made of cast iron is secured to the brake disc body by friction welding or by an alfin process.

Since an aluminum alloy has a greater coefficient of thermal expansion than that of iron-containing metal such as cast iron, the use of a construction in which a cast iron disc is bonded to an aluminum alloy brake disc body is apt to cause warping, bending or flexing of the brake disc due to thermal stresses generated by temperature increases during braking. Such warping, bending and flexing, under extreme conditions, can result in separation of the iron disc from the brake disc body.

Moreover, in order to affix the cast iron ring to the aluminum alloy brake disc body, a specific bonding device is required and, hence, the associated manufacturing costs increase.

In other applications, such as with aluminum alloy connecting rods, valve lifters, tappets and rocker arms of engines, it becomes necessary to improve the wear resistance of a wear surface thereof. In particular, when an aluminum alloy is used for the parts and when the parts will be used under high temperature conditions, the high thermal load practically mandates an improvement to the aluminum alloy wear surfaces.

SUMMARY OF THE INVENTION

Accordingly, one object of the present invention involves the fabrication of an aluminum alloy part having a wear surface that has a high wear-resistance. Another object of the present invention involves providing an aluminum alloy part which is subjected to a high thermal load, such as an engine part, and which has a slide surface having much improved wear resistance. It is a further object of the present invention to provide an aluminum alloy brake disc body for a disc brake device that has a metal layer of a high wear-resistance and, yet, which generates reduced thermal stresses and requires reduced manufacturing costs.

Accordingly, one aspect of the present invention involves a method of forming an expandable wear surface on an aluminum alloy component. The method comprises preparing the aluminum alloy component and then plating the component with a layer of wear resistant material. A network of cracks is formed through the layer of wear resistant material such that the network of cracks comprise multiple fragments. Each fragment preferable has an interstitial size defined by as a diameter of a circle that is inscribed between the cracks defining any single fragment.

Another aspect of the present invention involves an aluminum alloy part having a plated wear resistant surface. The part generally comprises an aluminum alloy substrate and a plated wear resistant surface covering at least a portion of the substrate. The wear resistant surface has a plurality of wear resistant surface fragments that are separated from one another by cracks. The cracks form a network of cracks.

For the purpose of summarizing the invention and the advantage achieved over the prior art, certain objects and advantages of the invention have been described above. Of course, it is to be understood that not necessarily all of the objects or advantages may be achieved in accordance with any particular embodiment of the invention. Thus, for example, those skilled in the art will recognize an invention may be embodied or carried out in a manner that achieves or optimizes one advantage or group of advantages as taught herein without necessarily achieving other objects or advantages as may be taught or suggested herein. In addition, further aspects, features and advantages of the present invention will become apparent from the detailed description of the embodiments that follow.

BRIEF DESCRIPTION OF THE DRAWINGS

These and other features, aspects and advantages of the present invention now will be described with reference to the drawings of several preferred arrangements, which arrangements are intended to illustrate and not to limit the present invention, and in which drawings.

DETAILED DESCRIPTION OF THE PREFERRED EMBODIMENTS OF THE INVENTION

Figure 1:
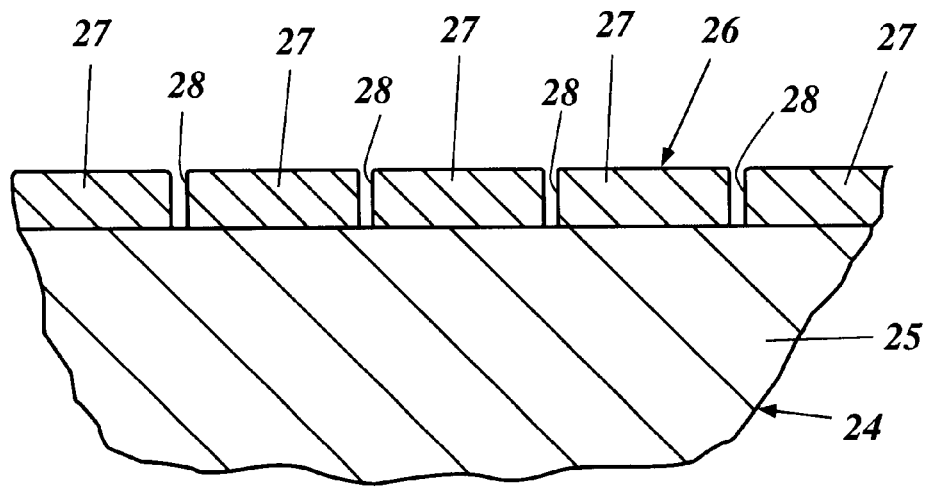
FIG. 1 is an enlarged sectioned view showing cracks formed in a plating layer.

The present invention generally relates to plating expandable wear surfaces on various components. As will be explained, the wear surfaces can be formed on any number of components susceptible to early wear and subjected to extreme temperature changes. Accordingly, the following description will introduce a variety of components and relative wear locations for each. Of course, similar wear surfaces can be plated on other components as well. Following an introduction of the components, plating apparatus useful for some of the components also will be described in detail. Finally, several processes for forming the unique wear surfaces will be described in detail. While the use of individual wear surfaces on the various components may not be unique, the particular types of wear surfaces, the configurations of the wear surfaces and the methods of creating the wear surfaces of the present invention evidence a number of distinct advantages over the wear surfaces described above in the Background of the Invention.

In general, the components described below preferably are formed of an aluminum alloy. Such a material selection reduces the weight of the vehicle with which many of the target components hereinafter described are associated. Table 1 presents a number of aluminum alloys, for example Alloys 1 through 3, that have particular utility in forming brake disc bodies, valve lifters, tappets, rocker arms, pistons or connecting rods. Of course, the use of other alloys is also contemplated.

TABLE 1

Examples of Aluminum-alloy Components

| Alloy No. | Chemical component (%) | | | | | | | | Characteristics |
|---|---|---|---|---|---|---|---|---|---|
| | Cu | Si | Mg | Zr | Fe | Mo | V | Al | |
| Alloy 1 | 1 | 17 | 0.5 | 1 | 5 | | | balance | high strength |
| Alloy 2 | | | | 0.75 | 8.5 | 1 | 1 | balance | high heat-resistance |
| Alloy 3 | | | | 1 | 8 | 2 | 2 | balance | high heat-resistance |

Alloy 1, shown in the Table 1, advantageously is used to increase strength while Alloys 2 and 3 are used to increase heat resistance. As is known, if a component is made of a particular aluminum alloy, strength of that component typically is reduced by temperature increases encountered during use (i.e., during braking or during engine operation). The associated strength reduction can cause easy deformation, and possibly failure, of that component. To avoid such a condition, Fe and Zr can be added to improve the strength and the heat resistance of components formed of the alloys.

As will be described, certain components (such as those manufactured of Alloys 1 or 3) preferably are formed in a billet and then forged. For example, the billets of Alloy 1 are formed by spray forming, which generally results in improved strength due to grain refining (grains of sizes less than about 1 micrometer) in the metal structure. Of course, one micrometer is the same as one micron. Components generally are not cast of Alloys 1, 2 and 3 because the coarse intermetallic-compounds of Al—Fe crystallize after being melted and cooled. The crystallization can cause the material to become brittle. Other manufacturing processes, such as, for example, casting, can be used to form brake disc bodies, valve lifters, rocker arms, pistons or connecting rods from suitable aluminum alloys, as readily understood by one skilled in the art.

Figure 2:
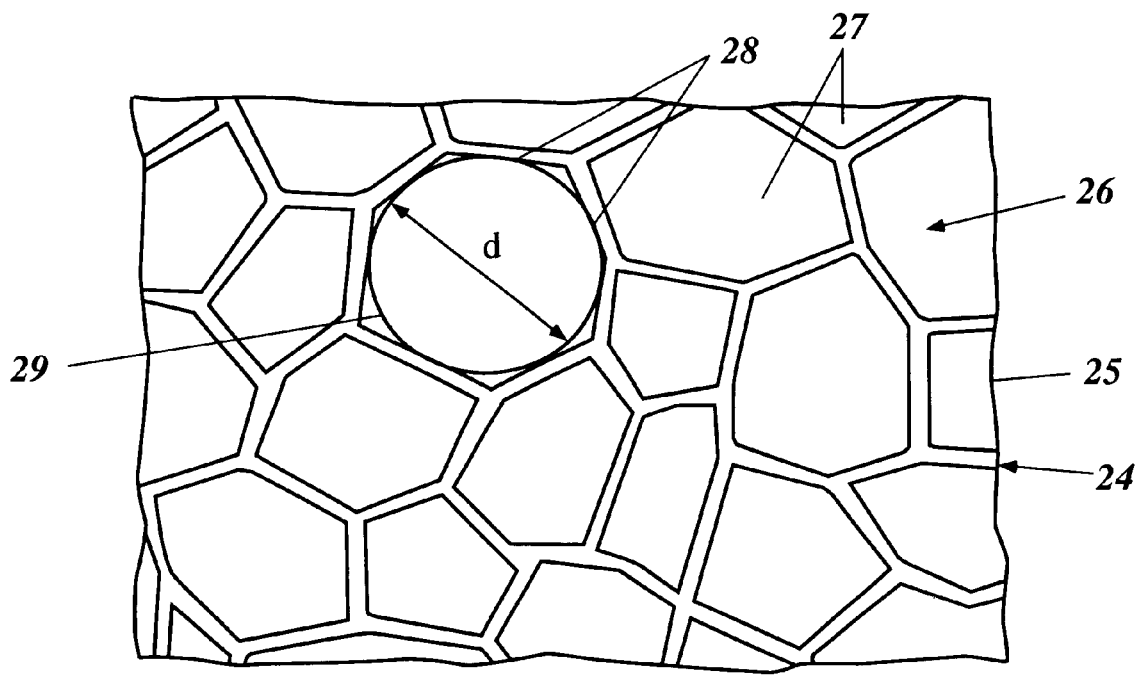
FIG. 2 is an enlarged plan view of the plating layer of FIG. 1 showing an inscribed circle superimposed on one chip of the plating layer.

With reference now to FIGS. 1 and 2, the wear surfaces configured in accordance with certain features, aspects and advantages of the present invention are illustrated therein. As illustrated, a target component 24, which is preferably made of an aluminum alloy 25, receives a plated wear surface 26 in manners which will be described in detail below. Advantageously, the wear surface 26 is subdivided into minute portions 27, or fragments, by a network of cracks 28. Each fragment preferable has an interstitial size defined by as a diameter of a circle that is inscribed between the cracks defining any single fragment.

Together, the cracks 28 form a fine network of cracks. Each crack 28 also preferably has the width of between about 1 and about 10 μm. The crack density desirably is between about 10 and about 30 mm/mm². The term "crack density" is defined as the total length (mm) of cracks 15 per 1 mm² of plated surface area. In the illustrated arrangement, most of the inscribed circles 29, which are superimposed on the individual fragments formed by the cracks 28, of the network have the diameter d of less than about 1.5 mm. This dimension, as will be explained in detail below, allows the fragments to be securely attached to the substrate (i.e., the target component) while also allowing the plated layer to expand and contract in response to changes in temperature. In addition, in certain applications, the cracks can form pockets in which small amounts of lubricant can pool and be held. Thus, the cracks also can be used to make the plated wear surface more lubricious when lubricant is applied to the wear surface.

1. Some Exemplary Aluminum Alloy Components

A. Brake Discs

Figure 3:
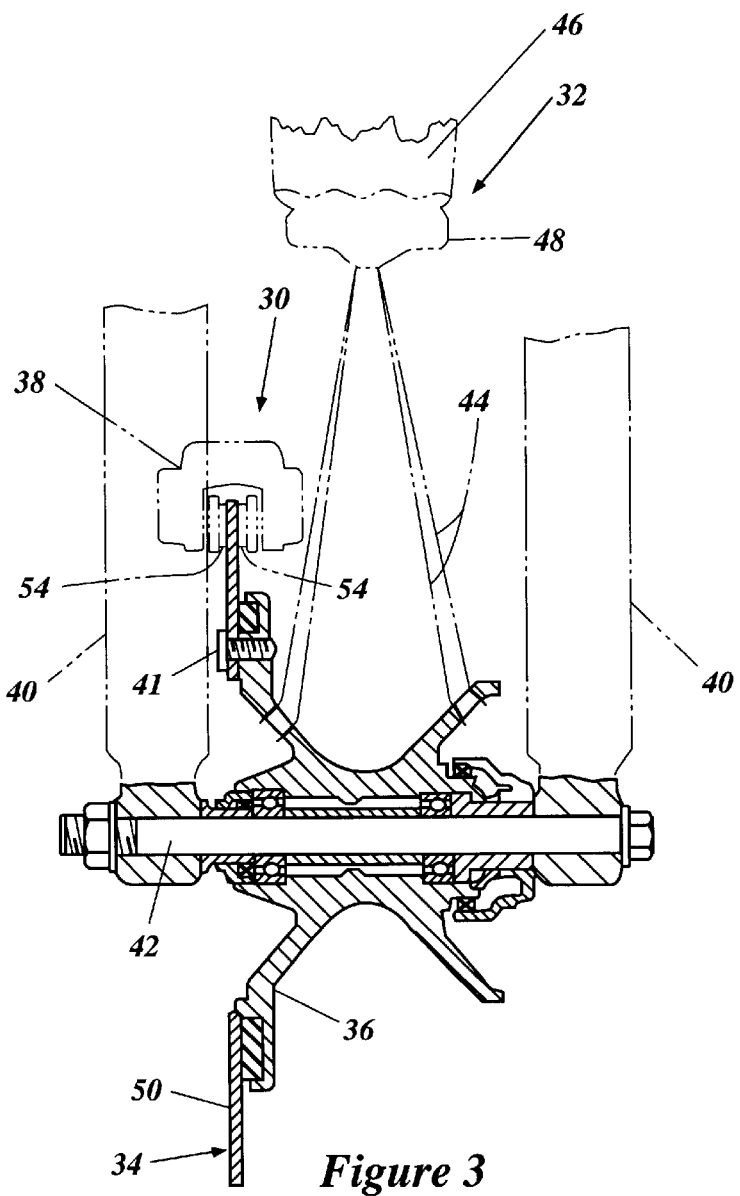
FIG. 3 is a sectioned front elevation view of a wheel and disc brake arrangement in which a wheel, a fork arrangement for carrying the wheel and a brake caliper are illustrated in phantom lines.
Figure 4:
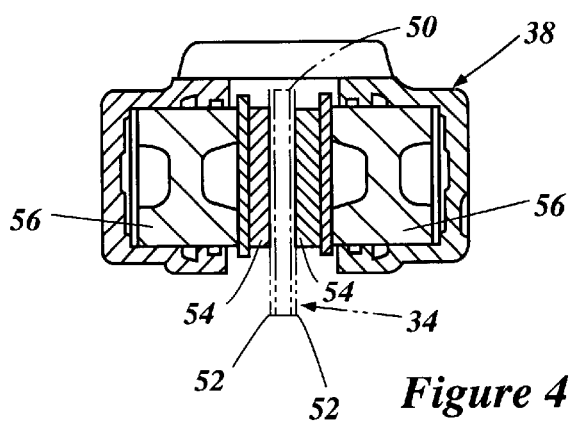
FIG. 4 is an enlarged sectioned front elevation view of the brake caliper and a brake disc that is interposed between a pair of brake pads of the brake caliper.

With reference now to FIGS. 3 and 4, a brake disc that is used in a disc brake unit is formed with a wear surface in accordance with certain features, aspects and advantages of the present invention. The illustrated brake disc is shown in the context of a motorcycle disc brake device. Of course, the disc brake device also could be used in a variety of environments, such as but not limited to, automobiles, tractors, snowmobiles, all terrain vehicles, and the like. Accordingly, the following description relates to only one application of the disc brake device. Many other applications also are possible.

With continued reference to FIG. 3, the disc brake device, which is indicated generally by the reference number 30, is for a front wheel 32 of a motorcycle. As is known, the illustrated disc braking device 30 generally comprises a brake disc 34 fixed on a hub 36 of the front wheel 32 and a brake caliper 38 fixed on a front fork 40. The illustrated brake disc 34 is connected to the hub 36 through the use of a threaded fastener 41.

In the illustrated arrangement, the hub 36 is fixed directly to the inner circumference of the brake disc 34. In this arrangement, the disc 34 has been manufactured of an aluminum alloy having high heat-conductivity to transfer heat from the disc 34 to the hub 36. Of course, if heat radiation from the brake disc 34 is sufficient (i.e., the brake disc 34 has a relatively large surface area not in contact with the brake pads 54), the brake disc 34 can be mounted on the hub 2 through an annular mounting plate (not shown). In some arrangements, the plate (not shown) can be made of iron-base alloy and can be fixed to the brake disc 34 on one side surface. When a mounting plate (not shown) is used, the brake pad 54 preferably contacts with a surface of the brake disc 34 opposite of the surface to which the plate is attached.

As illustrated, the hub 36 of the front wheel 32 is mounted to revolve around an axle 42 and the front wheel 32 is connected to the illustrated hub through a set of spokes, illustrated schematically and generally indicated by the reference numeral 44. As is generally known to those of ordinary skill in the art, the front wheel 32 generally comprises a tire 46 that is carried by a rim 48.

With reference now to FIG. 4, the illustrated brake disc 34 is comprised of a brake disc body 50 and a pair of wear surfaces 52. The disc body generally is formed in a disc shape and preferably is manufactured from an aluminum alloy such as those discussed above. The wear surfaces 52 preferably are formed on the both sides of the disc body 50. Preferably, the wear surfaces 52 are manufactured from wear resistant metals such as Fe, Fe—Cr alloys, Cr and Ni.

The wear surfaces 52, as will be explained in detail below, desirably are formed by plating over at least a portion of the brake disc body 50. In the illustrated wear surfaces 52, a network of microscopic cracks advantageously is formed over a substantial area of the plated wear surfaces. More preferably, the cracks cover the entire plated wear surface. As explained above, by forming the cracks, the plated wear surfaces are actually composed of a number of individual microscopic metal pieces separated from one another by the cracks. These cracks advantageously allow relative thermal expansion between the individual metal pieces and, thus, create an expandable plated wear surface.

The wear surfaces 52 form friction surfaces that are selectively engaged by a set of brake friction pads 54 held by the brake caliper 38. As such, the rotational movement of the wheel 32 about the axle 42 is slowed or stopped by application of the brake pads 54 to the brake disc 34. To accomplish such braking action, the calipers 38 include a set of hydraulic pistons 56 that selectively engage the brake pads 54 with the brake disc 34. Thus, the brake pads 54 can squeeze on the wear surfaces 52 of the brake disc 34 to generate sufficient friction to slow or stop the wheel rotation.

The brake pads 54 preferably are formed with the material having lower hardness than the material forming the wear surfaces 52 of the brake disc 34. By manufacturing the working surfaces of the brake pads 54 of materials having a lower hardness than the wear surfaces 52 of the brake disk, the brake pads 54 wear significantly more than the brake discs 34. Thus, the less expensive brake pads 54, which can be more easily changed, require replacement more frequently than the brake discs 34.

Common materials used for the working surfaces of the brake pads 54 include synthetic resin materials or sintering materials containing copper. With reference to the following tables, several exemplifying compositions are presented therein. Tables 2 and 3 present synthetic resin pad materials and Table 4 presents sintered pad materials.

TABLE 2

Synthetic Resin Friction Pad Materials

| Reinforcement Component | Binder | Filler |
| --- | --- | --- |
| Fibrous metal containing Zn, Mn, C, Cr, S or Al | Sulfur | Aluminum granulates |
| Acrylic pulp | Rubber latex | Vermiculite |
| Aramide pulp | Phenol type resin | Mica |
| Aramide fiber | Mixture of phenol type resin and nitrile rubber | Molybdate |
| Ceramic whisker of alumina or silica | Furan resin | Alumina agglomerate |
| Ceramic fiber of alumina or silica type | Polyimide | Graphite |
| Polycrystal fiber of potassium-barium 6-titanate substituted with aluminum | Meso-phase pitch | Calcium carbonate |
| Glass fiber | Calcium carbonate | Barium carbonate |
| Zeolite fiber | Thermosetting resin | |
| Cellulosic fiber | Aromatic nitro compound | |

TABLE 2-continued

Synthetic Resin Friction Pad Materials

| Reinforcement Component | Binder | Filler |
|---|---|---|
| Bacteria cellulose | | |
| Polyacrylonitrile fiber | | |
| Copper fiber | | |
| Non-asbestos fiber | | |
| Aromatic Polyamid fiber | | |

TABLE 3

Synthetic Resin Friction Pad Materials

| Friction Adjuster | Abrasive | Lubricant | Others |
|---|---|---|---|
| Cashew nut powder | Alumina | Chalcoblite | Carbide, oxide or nitride of Si or Al |
| Rubber scrap | Silica | Soap | Alumina |
| Cork | Zirconia | Calcium fluoride | Coke |
| Susolite Mica | Zircon | Metal sulfide | Alkali metal titanate compound powder |
| Cellulose | Magnesia | Hydrocarbon Wax | Pitch |
| Talc | Mullite | Cryolite | Calcium fluoride |
| Tripoli | Iron oxide | Flake graphite | Fluoroplastic fiber |
| Vermiculite | | Antimony sulfide | Synthetic graphite |
| Balite | | Molybdenum sulfide | Calcium oxide |
| Whiting | | | Magnesium oxide |
| Latex | | | Manganese oxide |
| Latex-impregnated vermiculite foam | | | Carbon |
| Oxide of rare earth element | | | Elastic graphite |
| Copper oxide powder | | | Natural graphite |
| | | | Metal powder, copper type |
| | | | Metal powder, aluminum type |
| | | | Metal powder, iron type |

TABLE 4

Sintered Friction Pad Materials (%)

| Example No. | Cu | Ni | Fe | Zn | Sn | Ni—Cr alloy (Ni: Cr is 80:20 to 60:40) | Others |
|---|---|---|---|---|---|---|---|
| Example 1 | 40–50 | 8–20 | 0.1–6 | 3–7 | 1–7 | | * |
| Example 2 | balance | | 3–7 | | 3–7 | | * |
| Example 3 | 1–5 | | balance | | 1–3 | | * |
| Example 4 | balance | | | | | 10–25 | * |
| Example 5 | balance | | | less than 8 | 2–8 | | ** |

\* Includes Graphite, Ferrosilicon, Metal oxide, Zirconia, Mullite, Silica, Silicon carbide, Silicon nitride.
\*\* Includes between about 20 and about 35% by weight of C and between about 4 and about 10% by weight of $SiO_2$.

For use with brake discs manufactured according to certain features, aspects and advantages of the present invention, the hardness of the sintered friction pads preferably is less than about 50 on the Rockwell B hardness scale. Moreover, in Table 4, compounds referred as "Others" include materials having a composition ratio of less than about 10 percent.

To reduce the weight of the brake disc 34, the brake disc of the present invention is preferably formed of a light material disc body, such as an aluminum alloy discussed above, having at least one wear surface plated thereto.

Figure 5:
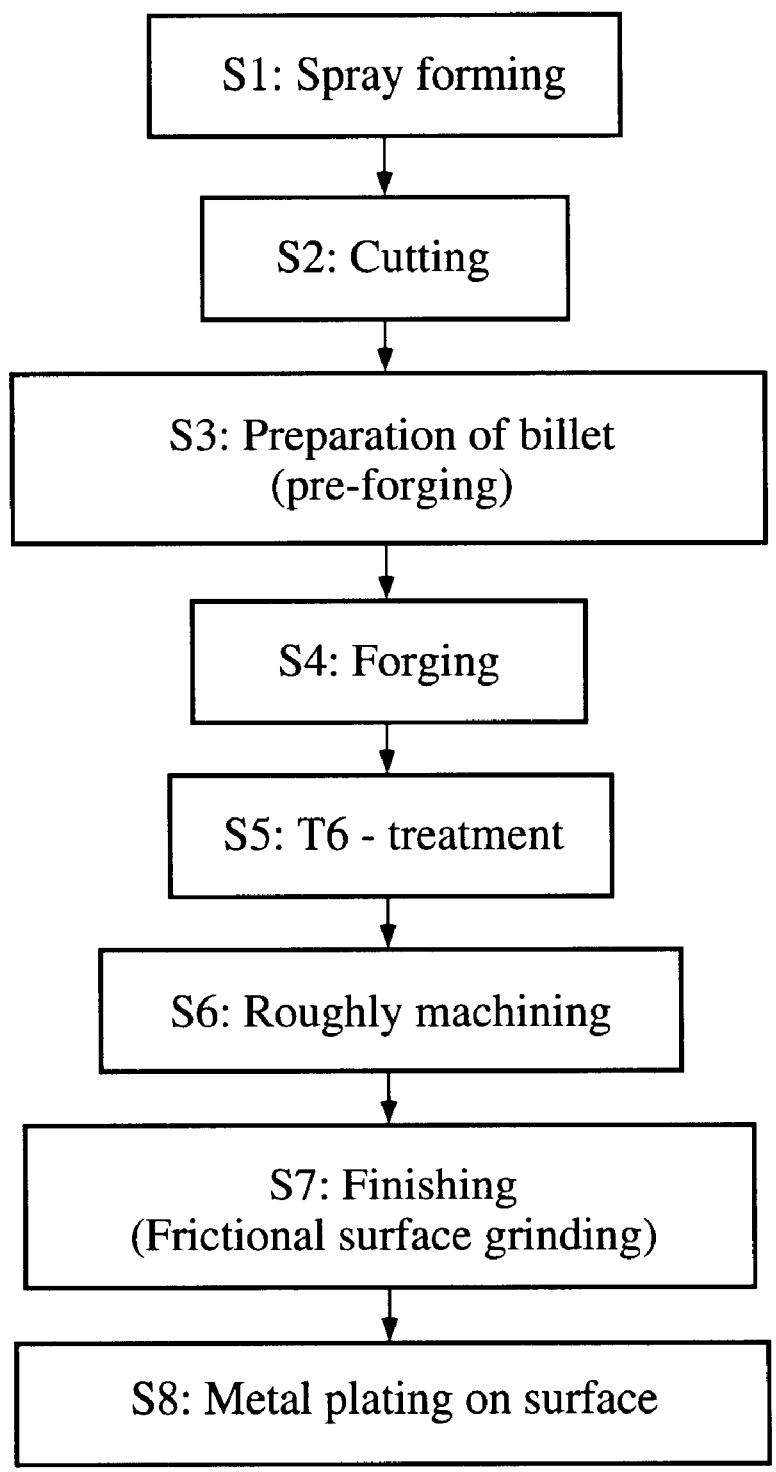
FIG. 5 is a flow diagram showing a process for manufacturing and plating a target component.

With reference now to FIG. 5, one method of making the brake disc body 34 will now be generally described. The brake disc 34 preferably is manufactured by forming of the brake disc body 50 to predetermined shape and then electrolytically plating the wear surfaces 52 to the brake disc body 50. While certain dimensions, temperatures and hardnesses are described herein, other dimensions, temperatures and hardnesses can also be used depending upon the application. Also, while the following describes a forged brake disc body, the brake disc body could be cast in some applications.

In the illustrated process of FIG. 5, a molten aluminum alloy is sprayed in a mist state from a nozzle into a target of predetermined radius during a step S-1. Preferably, the aluminum alloy mist is cooled while being sprayed such that it is partially solidified. This cooling can be effected by passing the mist through cool air or through normal temperature air. Spray forming builds an approximately cylindrically shaped cylinder of aluminum alloy. The cylinder has predetermined radius and is formed of solidified aluminum alloy particles each having a predetermined radius of approximately 350 millimeters, for example.

Next, in a step S2, the aluminum alloy cylinder is machined into a disc body having a thickness of approximately 50 millimeters, for instance.

This disc body is then pre-formed in a step S3. The pre-form step involves compressing the disc body to a thickness of about 30 millimeters and then forming a hole in the center. Thus, an annular disc body is formed having an increased density. Hereinafter, an increased density component will be referred to as a billet.

Next, in a step S4 of the illustrated process, the disc billet preferably is forged until it has a surface hardness of approximately 55–88 on the Rockwell B hardness scale and a thickness of approximately 15 millimeters.

In a step S5, the forged disc body is then heat-treated. Preferably, the forged disc body is treated in a T-6 process that includes a solution treatment at about 500 degrees Centigrade for about 4 hours, water-cooling and age hardening at about 200–300 degrees Centigrade for about 4 hours. Finally, the age hardened disc body is air cooled such that the disc body has both a surface hardness and an internal hardness of approximately 90–100 on the Rockwell B hardness scale.

During a step S6, the cooled and age hardened disc body is roughly machined into the proper dimensions. This rough machining step involves processing both the inner shape and the outer shape. Thus, the mounting hole is accurately formed and the disc body surface is roughly machined. The friction surface of the disc body can be machined in any suitable manner such that the surface has a surface roughness of approximately Ra 25 µm prior to finishing grinding.

In the finishing step S7, the friction surface of the disc body is ground until the surface roughness reaches approximately Ra 1–3.5 µm. Once the disc body has been adequately finished, the disc body is plated in a manner that will be described in detail below.

Additionally, as explained above, the target components can be formed by die casting processes. That is, instead of forming and forging a billet brake disc, the molten metal of aluminum alloy can be injected at a high pressure into a die, followed by cooling, cutting the gate and removing metal burrs. After these steps have been completed, the cast disc can be heat treated in a T-6 process, roughly machines, finish machined and prepared for plating.

B. Tappets

Before describing the pre-plating and plating of the disc body, however, further engine components having plated wear surfaces formed in accordance with certain features, aspects and advantages of the present invention will be described. For instance, the processes of the present invention also can be applied to tappets found in actuating mechanisms for intake control valves and exhaust control valves of engines.

Figure 6:
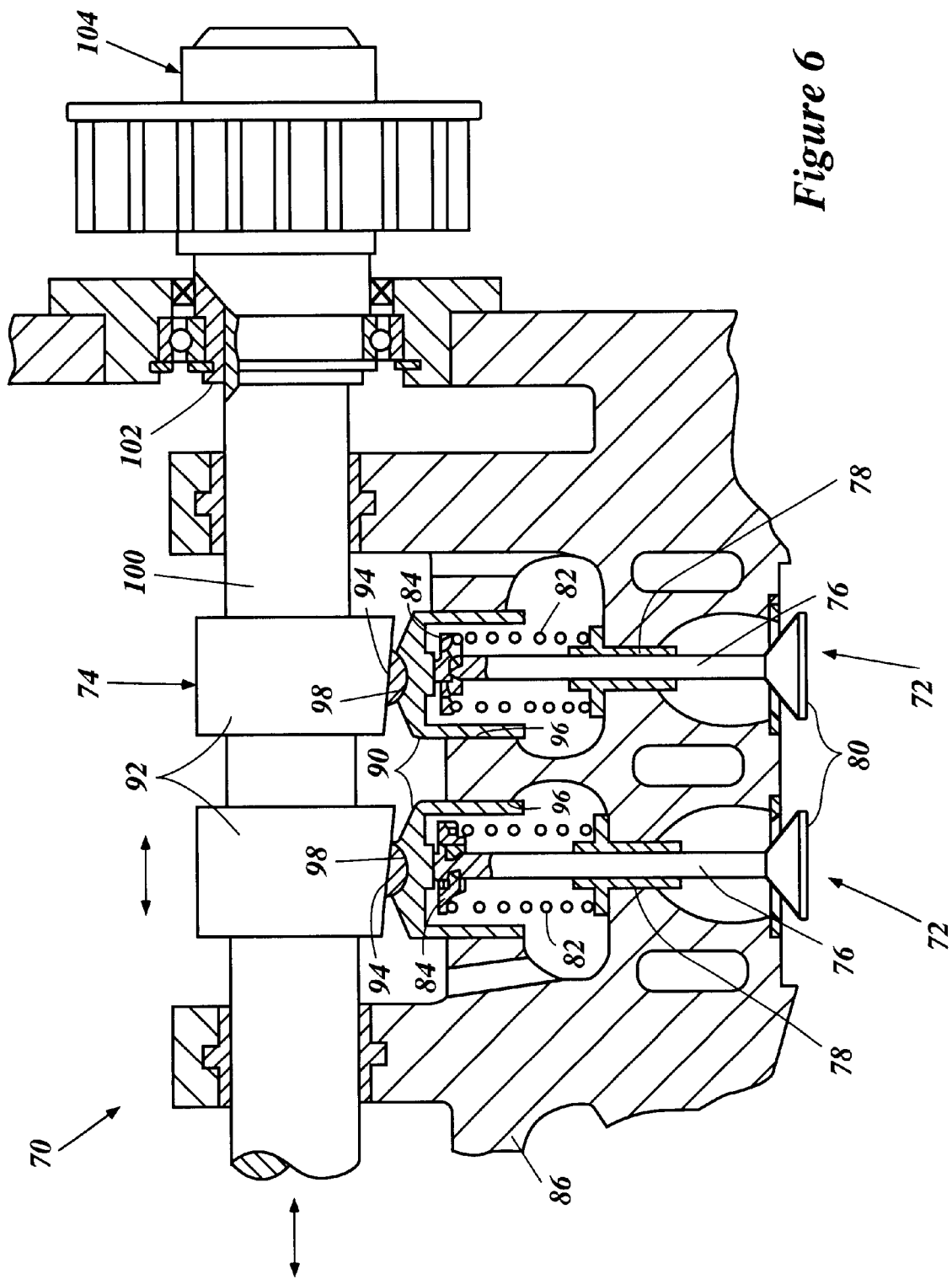
FIG. 6 is partially sectioned view of a cylinder head assembly in which a cam shaft and a valve actuating mechanism are mounted.
Figure 7:
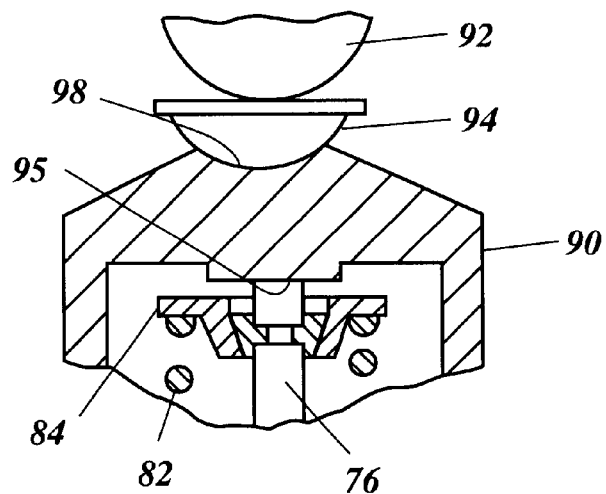
FIG. 7 is an enlarged partially sectioned view of a tappet and related valve actuating mechanism components.
Figure 8:
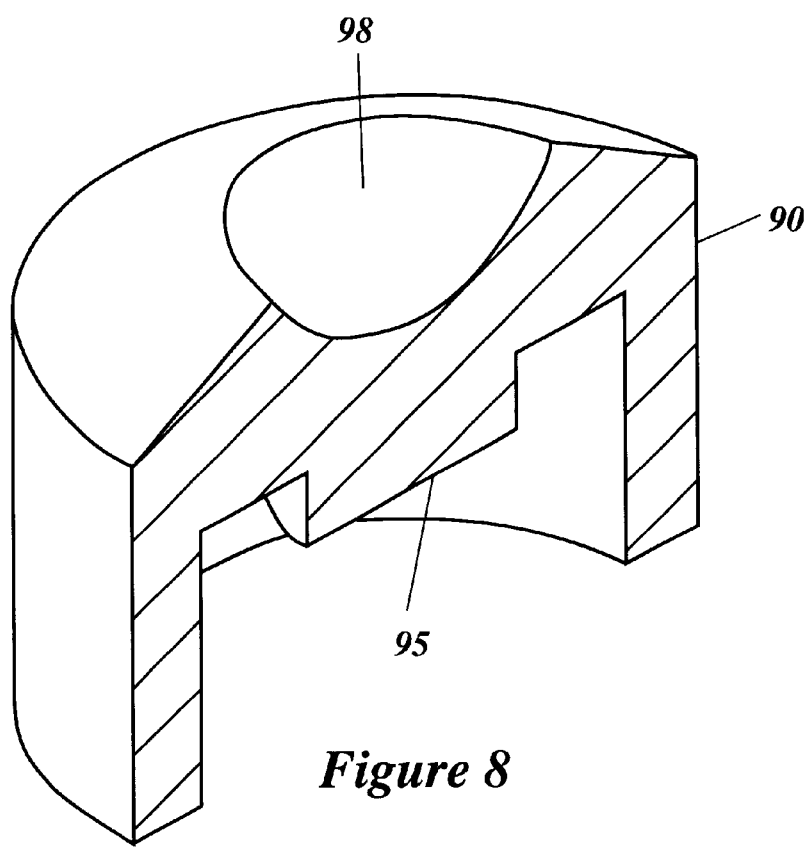
FIG. 8 is an enlarged partially sectioned perspective view of the tappet.

With reference now to FIGS. 6 through 8, an exemplifying tappet for a valve actuating mechanism will be described in detail. With initial reference to FIG. 6, a variable valve actuating mechanism, which is indicated generally by the reference numeral 70, is illustrated therein. The illustrated valve mechanism 70 drives a pair of intake valves 72 per cylinder through a single intake camshaft 74. Of course, one of ordinary skill in the art will readily recognize that a set of exhaust valves can also be actuated by similar mechanisms. Moreover, the number of intake valves (or exhaust valves) is not important to the present invention and can vary from application to application.

The illustrated intake valve 72 includes a valve stem 76 that extends upward through a valve guide 78 from a valve head 80. The valves 72 are biased into a closed position by a spring 82 in the illustrated arrangement. Thus, a spring retainer 84 is attached to the valve stem 76 of the intake valve 72. The valve spring 82 is interposed between the valve retainer 84 and a portion of the cylinder head 86 or the valve guide 78.

A tappet 90 is interposed between the valve stem 76 and a cam 92 of the camshaft 74. Preferably, the tappet 90 is a bottomed cylindrical shape formed by die casting or forging of aluminum alloy. Of course, any suitable method of manufacturing the tappet 90 can also be used. As shown in FIG. 6, a contact plate 94 is fitted into the top outside surface of the tappet 90 while the top inside surface 95 of the tappet 90 contacts an end of the valve stem 76. The outside circumferential surface of the tappet 90 fits slideably into a hole 96 formed in the cylinder head 86.

The contact plate 94 preferably is made of a highly wear resistant metal or ceramic material and has a structure that complements a hemispherical recess 98 formed in the top outside surface of the tappet 90. Thus, drive forces from the cam 92 are transmitted through the contact plate 94 to the tappet 90. The forces the pass through the tappet 90 to the valve stem 76.

The camshaft 74 comprises a camshaft body 100 that supports the cams 92. The camshaft body 100 is rotatably supported on the cylinder head 86. In addition, the camshaft body 100 preferably can translate axially relative to the cylinder head 86. A support shaft 102 advantageously is attached to one axial end of the camshaft body 100. The support shaft 102 also is rotatably supported on the cylinder head 86. In the illustrated arrangement, the support shaft 102 cannot translate axially relative to the cylinder head 86. A camshaft displacement device 104 is provided at the end of both of the components 100, 102.

Preferably, the cams 92 are formed in a three-dimensional shape so that the position of the contact profile of the cam surface changes in the radial direction of the cam shaft body 100 and so that the cam surface slopes relative to the axial direction. Thus, the camshaft displacement device 104 is formed such that simply the adjusting the axial position of the cams relative to the contact plates 94 can change the valve timing or the valve lift curve. Thus, with the variable valve actuating mechanism 70, the opening degree and opening-closing timing of the valves 72 can be altered by changing the portion of the cam surface that contacts the contact plates 94. Because the contact plates 94 are fitted in the hemispherical recesses 98 of the tappet 90, the contact plates 94 tilt to follow the cam surface. Thus, drive forces can be transmitted to the tappet 90 while the relative axial position of the cams 92 change.

Preferably, the tappet is formed with several wear surfaces. For instance, the tappet 90 includes the hemispherical recess 98, a surface that contacts the end of the valve stem 76 and a circumferential outer surface that slides within the hole 96 formed within the cylinder block 86. In accordance with certain features, aspects and advantages of the present invention, these surfaces preferably are formed with plated surfaces made of a high wear-resistance material. Additionally, these plating layers preferably are formed with a network of fine cracks in any manner that will be described.

C. Rocker Arms

Figure 9:
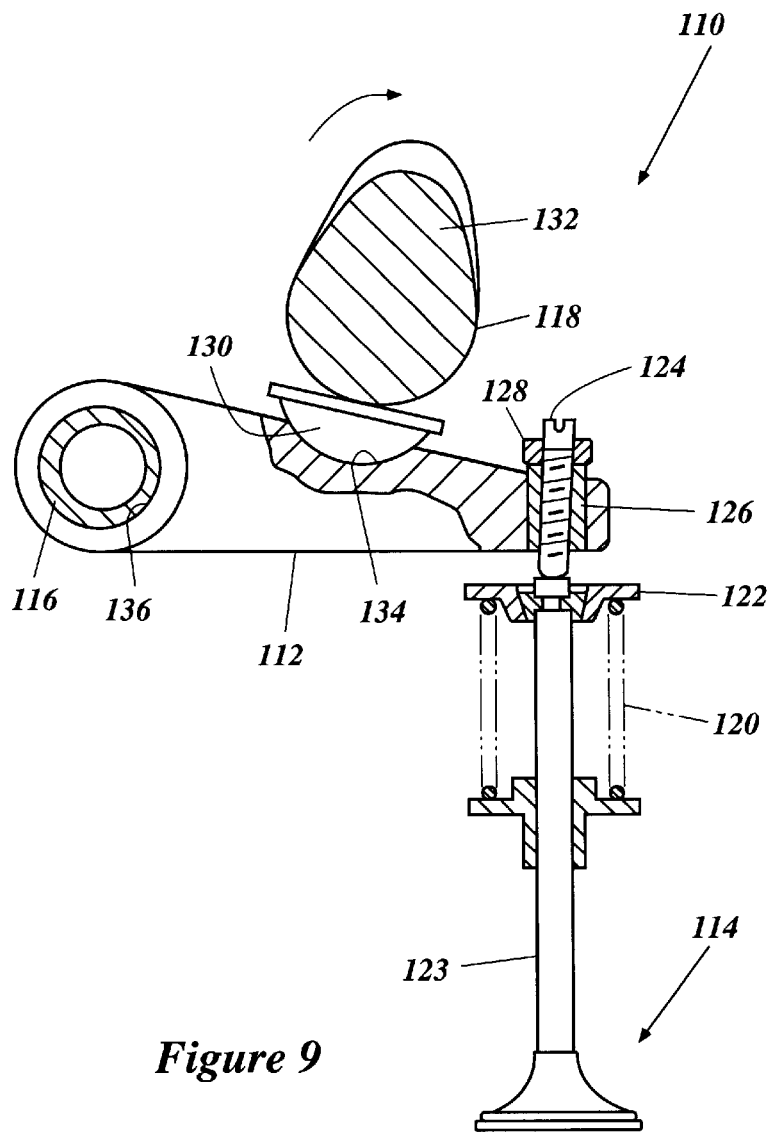
FIG. 9 is a partially sectioned view of another valve actuating mechanism.
Figure 10:
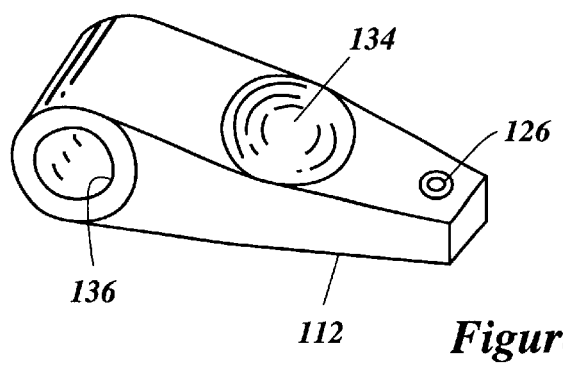
FIG. 10 is a perspective view of a rocker arm of the valve actuating mechanism.

With reference now to FIGS. 9 and 10, a further engine component that features wear surfaces having certain features, aspects and advantages of the present invention is illustrated therein. More specifically, a further valve actuating mechanism 110 is illustrated therein. The valve actuating mechanism employs a rocker arm 112 that drives a valve 114 in a known manner. The rocker arm 112 is carried by a rocker shaft 116 at a first end and is connected to the valve 114 (i.e., exhaust valve or intake valve) at the other end. A cam shaft 118 drives the rocker arm 112 in a downward motion while a return valve spring 120, which is captured within a retainer 122 attached to an end of a valve stem 123, provides an upwardly directed bias.

At the distal end of the illustrated rocker arm 112 is an adjustment screw 124 and a cylindrical insert member 126. Preferably, the insert member 126 is manufactured from stainless steel and includes a threaded outer surface. A lock nut 128 preferably is engageable with the adjustment screw 124 and is used to fix the valve in a desired position.

The rocker arm 112 preferably is formed of an aluminum alloy, such as those described above, by die casting or forging. A contact plate 130 is interposed between a cam 132 of the camshaft 118 and the rocker arm 112. The cam 132 desirably is of the three-dimensional type described above such that the cam surface radius changes both axially along the camshaft 118 and rotationally around the camshaft. Thus, moving the cam 132 relative to the contact plate 130 can alter the contact between the cam and the contact plate 130.

The illustrated contact plate 130 is ceramic and has a high wear-resistance. The contact plate includes a hemispherical boss that complements a hemispherical recess 134 of the rocker arm 71. The camshaft 118, similar to that described above, is connected to a camshaft displacement apparatus (not shown) that displaces the cam 132 in an axial direction relative to the rocker arm 112.

Plating layers having high wear-resistance are formed on the inner surface of the hemispherical recess 134 and the wall 136 of the hole through which the rocker shaft 116 extends. The plating layers are formed in a manner that will be described. Both the inner surface 134 and the wall 136 of the illustrated rocker arm 112 have wear surfaces formed in accordance with certain features, aspects and advantages of the present invention.

D. Pistons and Connecting Rods

While not illustrated, the method of manufacturing aluminum alloy parts according to certain features, aspects and advantages of the present invention can also be applied to pistons and connecting rods. The pistons preferably are formed by a die casting process or a forging process, using an aluminum alloy such as that disclosed above as the preferred material. Plating layers having high wear-resistance can then be deposited on the walls of the bores for a piston pin, a top surface, an outer circumference, and walls of piston-ring groves. Similarly, a connecting rod can be formed by a die casting process or a forging process. Plating layers having high wear-resistance then can be deposited on a top surface, an outer circumferential surface, and a wall of both the big end bore and the small end bore. For clarity, several of the elements of both the pistons and the connecting rods that are formed with wear surfaces will be identified by reference numerals during a later discussion of the respective plating apparatus.

2. Plating Apparatus for Some of the Above Components

A. Tappets

Figure 11:
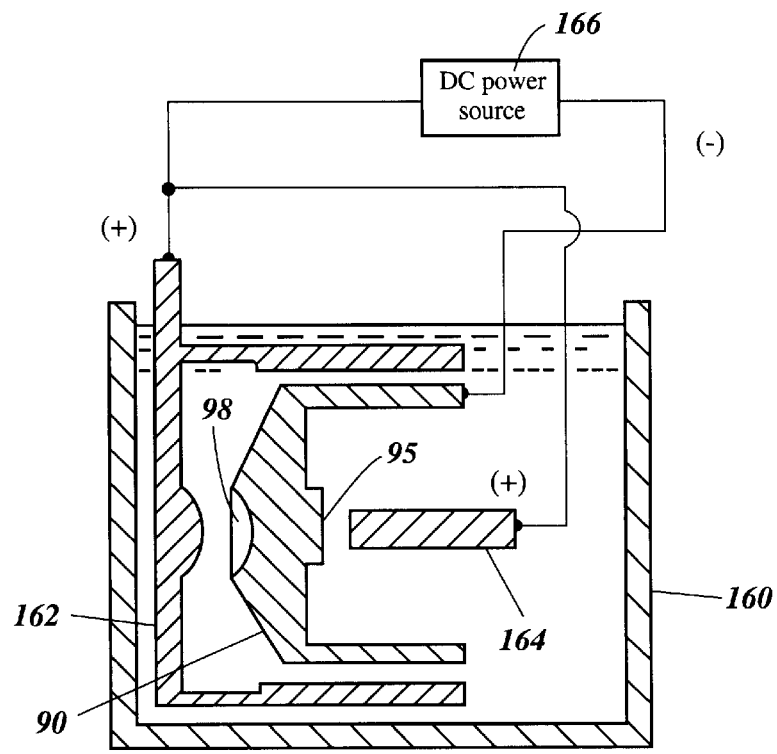
FIG. 11 is a sectioned and partially schematic view of a plating arrangement for the tappet of FIG. 7.

To plate the wear surfaces of the illustrated tappet 90, the tappet 90 is dipped in a plating liquid vat 160, as shown in FIG. 11. A first anode 162 is positioned proximate the top and circumferential surfaces of the tappet 90. The first anode 162 preferably has a bottomed cylindrical shape such that the anode 162 is bucket-shaped and the tappet 90 is positioned therein. A second anode 164 is disposed proximate the valve pressing surface 95 on the inside surface of the tappet 90. Both anodes 162, 164 are connected to a positive terminal of a DC power source 166 while the tappet 90 is connected to a negative terminal of the DC power source 166. Plating is then carried out in a manner that will be described below with the tappet 90 serving as the cathode.

Figure 12:
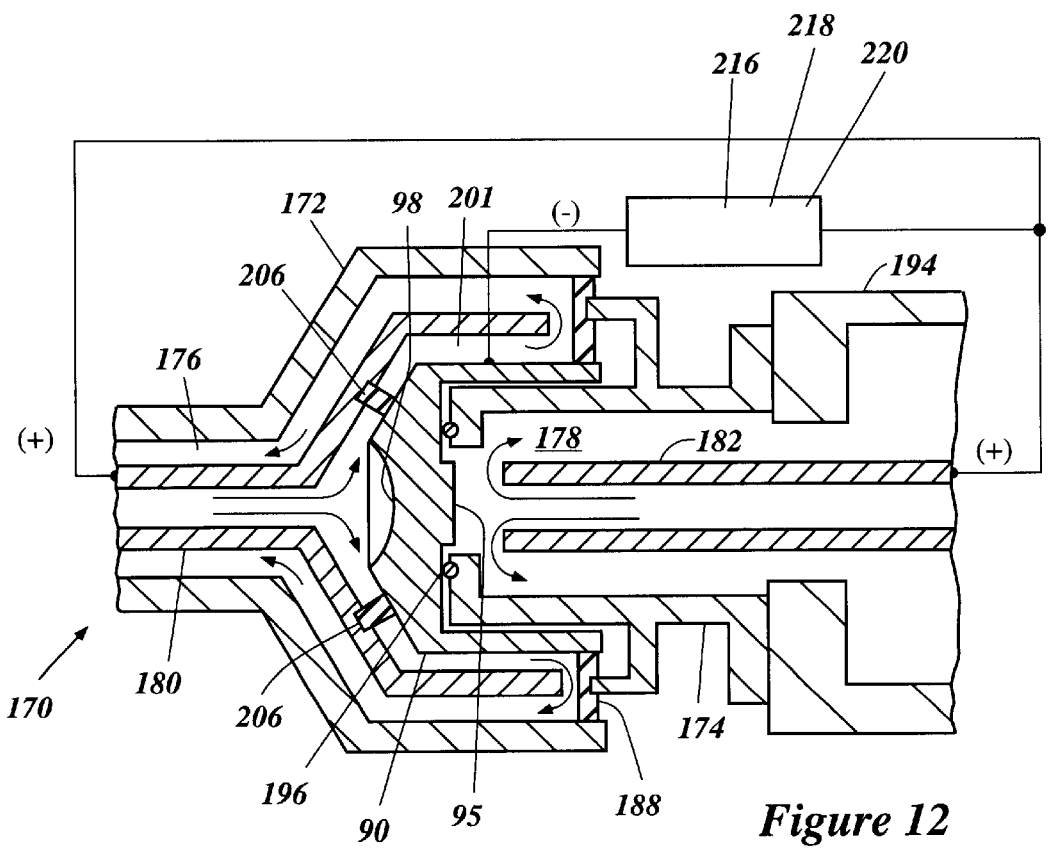
FIG. 12 is a sectioned and partially schematic view of another plating arrangement for the tappet of FIG. 7.
Figure 13:
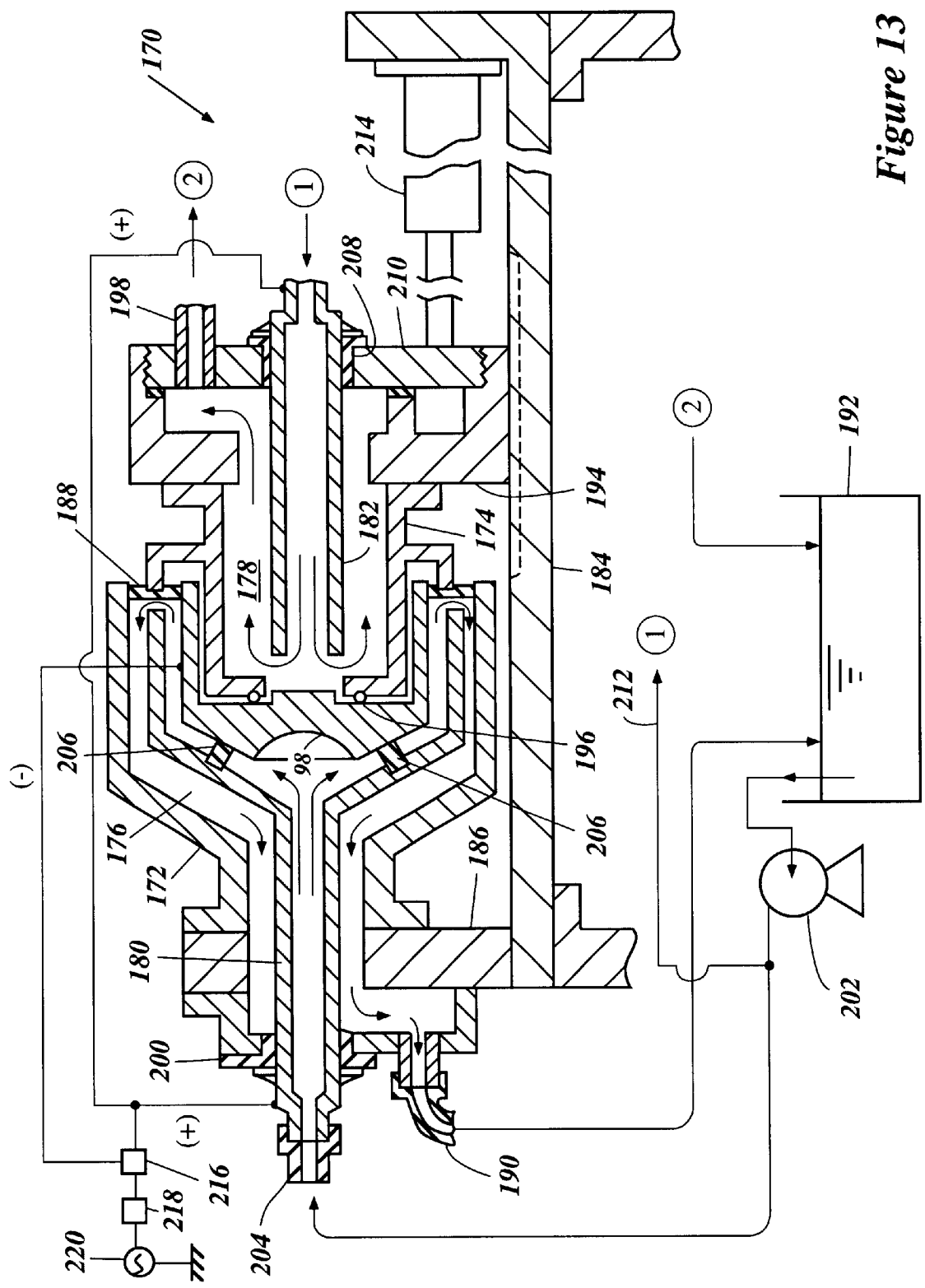
FIG. 13 is an enlarged sectioned and partially schematic view of the plating arrangement of FIG. 12 that illustrates a mounting assembly for the plating arrangement.

A high speed plating apparatus 170, such as that illustrated in FIGS. 12 and 13, also can be used to form the wear surfaces on the tappet 90. The high speed plating apparatus 170 generally comprises a first outer cylinder 172 and a second outer chamber 174. A first liquid plating chamber 176 is preferably defined between the first outer cylinder 172 and the tappet 90 while a second liquid plating chamber 178 is preferably defined between the second outer cylinder 174 and the tappet 90. Plating liquid is supplied to each of the chambers 176, 178 respectively by a first inner cylinder 180 extending through the first liquid plating chamber 176 and a second inner cylinder 182 extending through the second liquid plating chamber 178.

With reference now to FIG. 13, the first outer cylinder 172 preferably is secured to a pedestal 184 through a support member 186. An insulating seal 188 is positioned between the illustrated outer cylinder 172 and the tappet 90. Desirably, the seal member 188 is generally annular in shape and is supported by a flange extending away from the second outer cylinder 174.

The first chamber 176 is formed so that the hemispherical recess 98 of the tappet 90 is part of the chamber wall. The first chamber 176 is connected to a return pipe 190 for returning plating liquid back to a plating liquid vat 192.

A support member 194 on the pedestal 184 supports the second outer cylinder 174. As illustrated, the support member 194 preferably is configured to allow relative axial movement between the support member 194 and the pedestal 184. Thus, the second outer cylinder 174 also is capable of axial movement relative to the pedestal 184.

The support member 194 contacts the inside bottom surface of the tappet 90 through another insulating seal member 196. The second chamber 178 is formed so that the valve pressing surface 95 of the tappet 90 is part of the chamber wall. The second chamber 178 is then connected to a return pipe 198 for returning plating liquid back to the plating liquid vat 192.

The first inner cylinder 180 is supported through an insulation member 200 on the first outer cylinder 172. The first inner cylinder 180 has one end formed to accommodate the upper portion of the tappet 90 and the other end connected to the delivery port of a plating liquid pump 202 through a plating liquid supply pipe 204. The plating liquid pump 202 preferably delivers plating liquid from the plating vat 51 to the various supply lines.

The portion of the first inner cylinder 180 that opposes the top surface of the tappet 90 supports the tappet with stop rubbers 206. The stop rubbers 206 are disposed about the circumference of the first inner cylinder 180 so that a plating liquid passage 201 is maintained between the first inner cylinder 180 and the tappet 90.

The second inner cylinder 182 is supported on the support member 194 by an insulation member 208 and a disc-shaped cap 210. One end of the second inner cylinder 182 faces the valve pressing surface 95 formed inside the tappet 90 while the other end of the second inner cylinder 182 is connected to the delivery port of the plating liquid pump 202 through a plating liquid supply pipe 212. The cap 210 is connected to an air cylinder 214 that actuates the second outer cylinder 174 and the second inner cylinder 182 towards and away from the tappet 90.

In use, the high speed plating apparatus 170 circulates the plating liquid through the first and second chambers 176, 178 in a substantially continuous manner. The first and second inner cylinders 180, 182 are used as anodes while the tappet 90 is used as a cathode. The first and second inner cylinders 180, 182 and the tappet 90 are connected to a control circuit 216. The control circuit 216 preferably is connected to a rectifier 218 and an AC power source 220. Of course, other power supplies (i.e., DC power sources) can also be used.

The plating conditions (plating liquid composition, current density, and liquid temperature) for depositing the plating layer on the tappet 90 using the high speed plating apparatus 170 preferably are the same as in the immersion technique described above; however, the plating time for the tappet 90 is remarkably shortened when the high speed plating apparatus 170 is used.

B. Brake Discs

While not illustrated, an apparatus similar to the plating liquid vat 160 used to plate the tappets can be used to plate the brake discs. While the structure of the anodes would change, the general concept would remain the same. Specifically, one or more brake discs can be mounted to a support bar that extends in a generally horizontal direction when positioned in the vat. The support bar can be supported on a rack having plastic or insulating feet. Preferably, the support bar is removably attached to the rack.

A set of disk shaped anodes preferably are positioned in between each of the brake discs and the anodes and brake discs are insulated from the anode by rubber members. The brake discs are connected to a negative terminal of a DC power source while the disk shaped anodes are connected to the positive terminal of the DC power source. The voltage is then applied and the plating is performed in a manner that will be described below with the brake discs serving as the cathodes of the corresponding cells.

C. Rocker Arms

Figure 14:
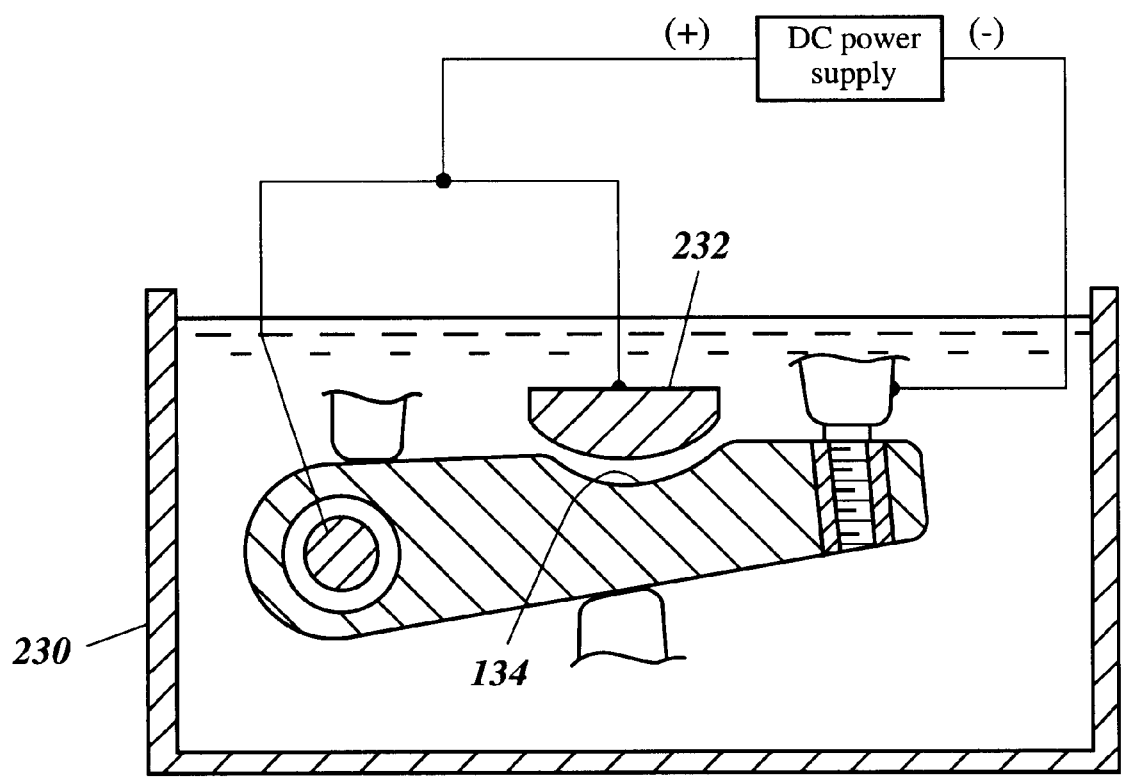
FIG. 14 is a sectioned and partially schematic view of a plating arrangement for the rocker arm of FIG. 10.

With reference now to FIG. 14, the rocker arm 112 can be dipped in a plating liquid bath 230 to form the wear surfaces on the hemispherical recess 134 and on the wall forming the rocker shaft hole. A first anode 232 preferably is positioned proximate to the hemispherical recess 134 and a second rod-like anode 234 preferably is positioned proximate the wall 136 defining the hole for the rocker shaft 116. Both of the anodes 232, 234 and the rocker arm 112 are connected to a DC power source 236 and a voltage is applied. The plating is then carried out with the rocker arm 112 acting as a cathode.

Once again, the plating conditions preferably are the same those identified below with respect to the brake disc. Specifically, the Fe or Fe—Cr plating process is carried out in accordance with the conditions specified in Table 6 below.

D. Pistons

Figure 15:
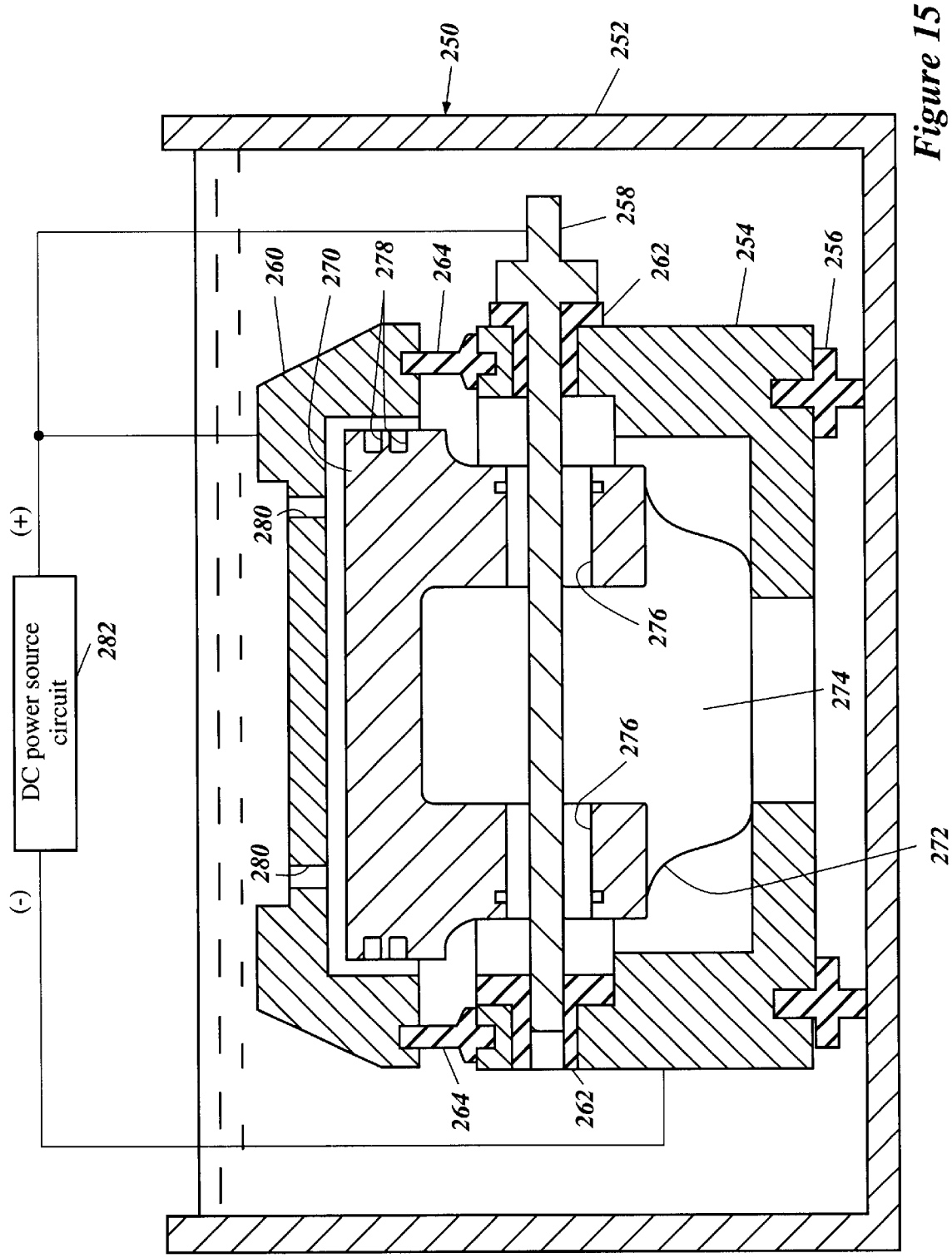
FIG. 15 is a sectioned and partially schematic view of a plating arrangement for a piston.

A piston plating apparatus 250 is illustrated in FIG. 15. The apparatus 250 is used to deposit strategically positioned wear surfaces. The illustrated plating apparatus 250 generally comprises a plating liquid bath 252 with a cylindrical cathode 254 having a substantially closed bottom end. The cathode 254 can be supported on a bottom of the plating liquid bath 252 through an insulating member 256. A first anode 258 and a second anode 260, in turn, are supported on the cathode 254 through insulating members 262, and 264, respectively.

With continued reference to FIG. 15, the cathode 254 has an internal surface 272 that supports a lower surface of the piston 270. The cathode 254 also preferably includes a structure that covers at least a portion of the piston skirt 274. Moreover, in the illustrated arrangement, the inner surface of the cathode 254 is formed such that the cathode 254 accommodates the piston skirt 274.

In the illustrated arrangement, the first anode 258 is a round bar that can be inserted through a piston pin bore 276. As will be recognized by those of ordinary skill in the art, the piston pin bore 276 is sized and configured to accept a piston pin when assembled.

The second anode 260 is formed in a cylindrical shape having a substantially closed top end. The second anode 260 advantageously covers both the top surface and the external circumferential surface of the top portion of the piston 270. As used herein, the top portion of the piston 270 includes the areas proximate the piston ring grooves 278. Thus, the second anode 260 and the cathode 254 of the illustrated arrangement form a clamshell structure that substantially encases the piston 270. Furthermore, a plurality of holes 280 are positioned on a portion of the second anode 260 to allow plating liquid to flow into direct contact with a top surface of the piston 270.

In use, the piston 270 is placed within the cathode 254 and the anode 260. The anode 258 also is inserted into the piston 270. The anodes 258, 260 and the cathode 254 are connected to a DC power source 282 in any suitable manner. Voltage then is applied to the cathode 254 and the anodes 258, 260 from the DC power source 282. Preferably, the plating conditions are the same those described below. Specifically, Fe plating or Fe—Cr plating is carried out under the conditions shown in Table 6.

E. Connecting Rods

Figure 16:
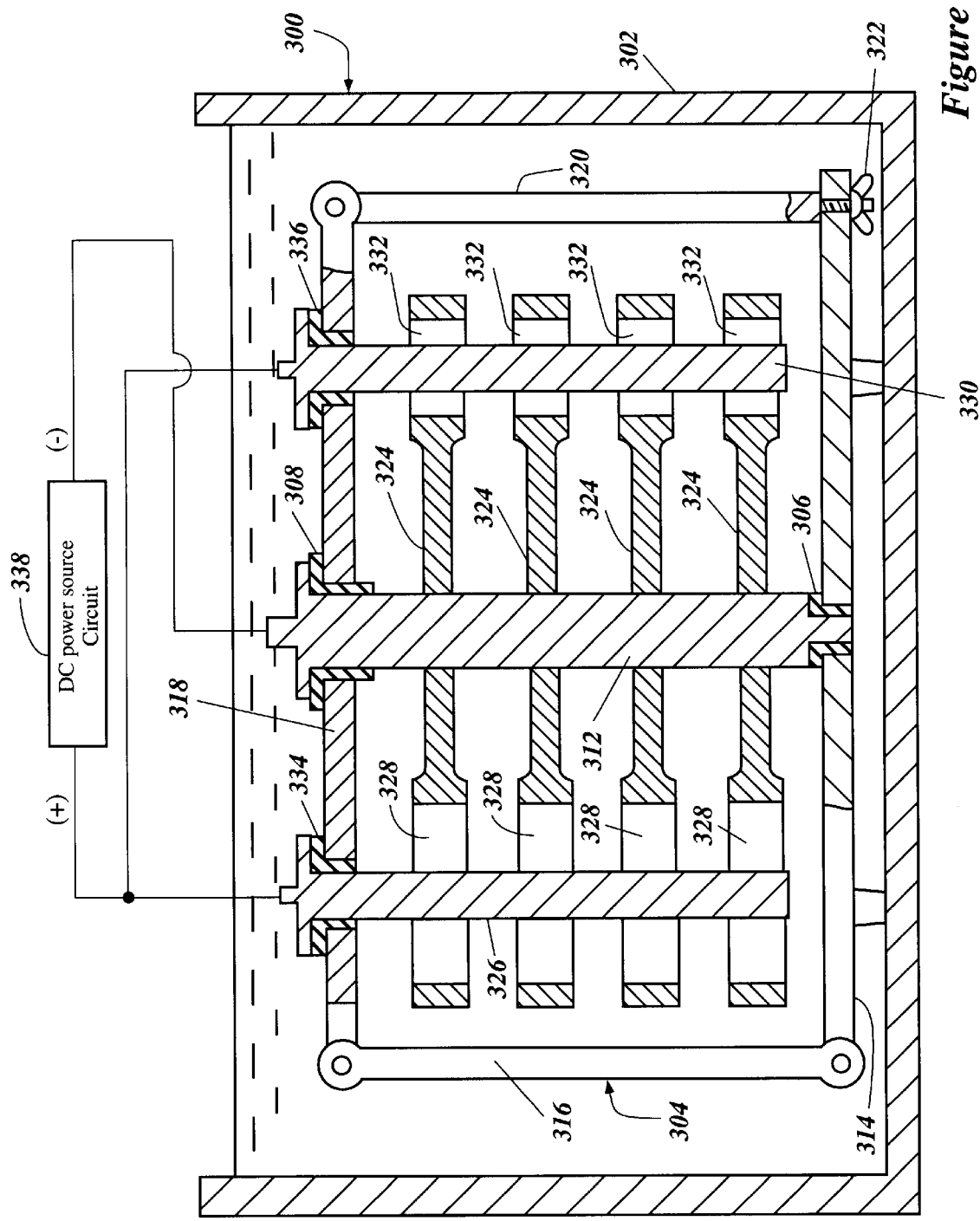
FIG. 16 is a sectioned and partially schematic view of a plating arrangement for a set of connecting rods.

With reference now to FIG. 16, a plating apparatus 300 that is used to plate connecting rods is illustrated therein. The plating apparatus 300 generally comprises a plating liquid bath 302 and an electrode support member 304 that is supported on a bottom of the bath 302 in any suitable manner.

In the illustrated arrangement, the electrode support member 304 comprises a pedestal 314 that is placed on the bottom of the plating liquid bath 114. The pedestal 314 can rest on insulating feet in some arrangements. A first connection member 316 is pivotally mounted at one end of the pedestal 314 and extends upward from the pedestal 314. A support plate 318 is pivotally mounted at the top end of the first connection member 316 and extends horizontally in the same general direction as the pedestal 314 when in use. A second connection member 320 is pivotally mounted on the end of the support plate 316 opposite the first connection member 316. The second connection member 320 is selectively secured by a wing nut 322 to the end of the pedestal 123 opposite of the first connection member 316. The wing nut 322 can be replaced by any of a number of fastening components, such as thumb screws, snaps, clamps, clips, locking tabs and the like. Of course, other electrode support members also can be used to secure a set of connecting rods during the plating process.

A cathode 312 passes through the support plate 318 and extends downward therefrom. The bottom end of the cathode 312 is supported on the pedestal 314 with an insulating member 306. In the illustrated arrangement, four connecting rods 324 are secured to the cathode 314 in spaced relationship relative to one another.

A first anode 326 is supported at one end of the support plate 318 and extends through big end bores 328 of the connecting rods 324 while a second anode 330 is supported at the other end of the support plate and extends through the small end bores 332 of the connecting rods 324. Both of the anodes are preferably insulated from the support plate 318 by rubber washers 334, 336 or the like In use, the anodes 326, 330 and the cathode 312 are connected to a DC power source 338 in any suitable manner. A voltage from the DC source 338 is then applied to the cathode 312 and to the first and second anodes 326, 330. Preferably, plating conditions are the same those discussed below. More specifically, an Fe or Fe—Cr plating process is carried out in accordance with the conditions specified in Table 6.

3. Pre-Plating, Plating and Cracking Processes

A. Pre-Plating

Prior to plating any of the above described target components, a pre-plating process preferably is carried out. By performing the pre-plating process, adhesion between the plating layer in the next plating process and the aluminum alloy layer as base material is improved.

Figure 17:
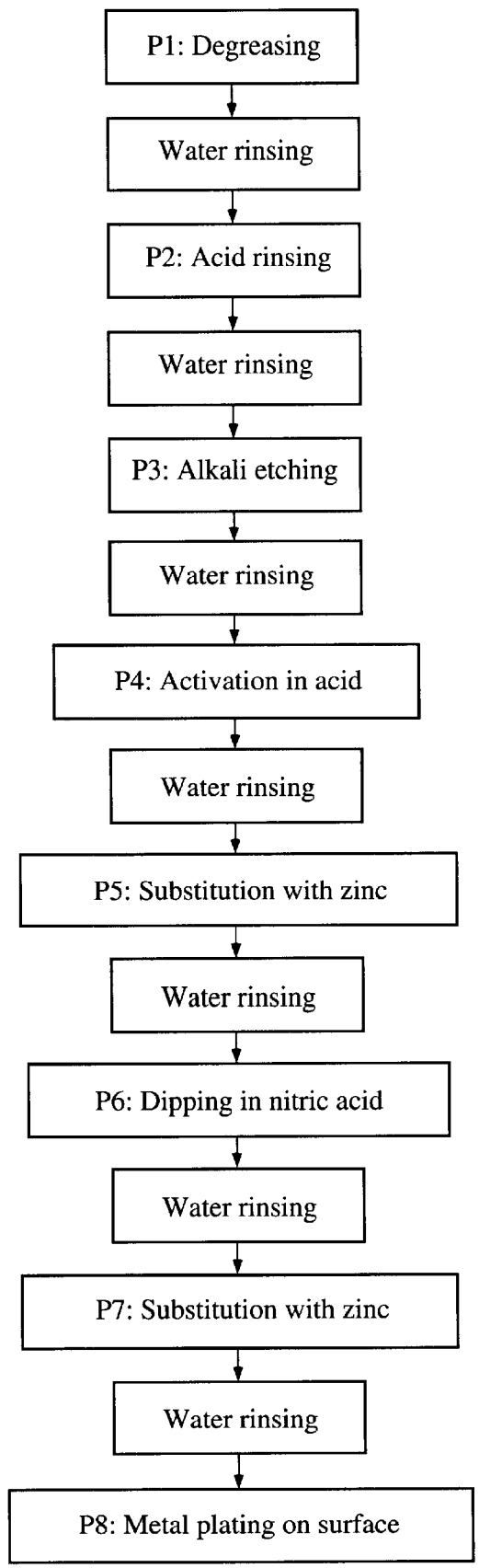
FIG. 17 is a flow diagram showing a process for pretreating a target component before plating.

The pre-plating process is generally the same as a pre-plating process performed prior to any electrolytic plating. As such, the pre-plating process, which is generally depicted in FIG. 17, begins with degreasing the target component in a step P1. The target component is soaked in an approximately 40 to 50 degree Centigrade bath of Silicate, Chelating agent and surfactant for a period of about 5 to 10 minutes.

After a water rinse, the target component is rinsed with ambient temperature acid (i.e., 500 ml/L of 62% Nitric acid) in a step P2. The acid rinse takes place for approximately 0.3 to 0.5 minutes (i.e., about 20 to 30 seconds).

Following another water rinse, the target component undergoes an alkali etching process indicated as step P3.

During the alkali etching process, the target component is subjected to a bath of 30–50 g/l Sodium hydroxide, Chelating agent and Surfactant that is held at approximately 40 to 60 degrees Centigrade. The etching process takes place for about 0.3 to 0.6 minutes (i.e., about 20 to 40 seconds).

Again, the target component undergoes a water rinse and then the target component is subjected to an acid activity process that is indicated as step P4. The acid activity process involves about 0.3 to 0.5 minutes (i.e., about 20 to 30 second) of rinsing in an ambient temperature mixture of 500 ml/L 62% Nitric acid and 50 g/L Hydrofluoric acid.

Following a further water rinse, a zinc substitution process is performed on the target component as indicated at step P5. The zinc substitution process involves a rinse lasting about 0.3 to 0.6 minutes (i.e., about 20 to 40 seconds) in a Sodium hydroxide and Zinc mixture that is held at about 20 to 25 degrees Centigrade.

Next, the target component is again rinsed with water. A nitric acid immersion process, which is indicated as step P6, is performed on the target component and a water rinse follows the nitric acid immersion. The nitric acid immersion involves a rinse lasting about 0.5 to 1.0 minutes (i.e., about 30 to 60 seconds) in 5% Nitric acid that is held at ambient temperature.

Subsequent to the sixth water rinse, a second zinc substitution process is performed during a step P7. Finally, the seventh water rinse and the plating process can begin in a step P8.

In each step of the pre-plating process, the target component is immersed for the predetermined processing period in respective baths having a specific treatment liquid (i.e., water based) that is kept at a predetermined temperature. The liquid also preferably has a predetermined composition. More specifically, the pre-plating process preferably is carried out under the conditions summarized in Table 5:

TABLE 5

Pretreatment Conditions

| Pretreatment process | Composition of treatment liquid | Bath temperature (Degrees Centigrade) | Treatment time (min) |
| --- | --- | --- | --- |
| Degreasing | Silicate Chelating agent Surfactant | 40–50 | 5–10 |
| Acid cleaning | 62% Nitric acid 500 ml/L | ambient temperature | 0.3–0.5 |
| Alkali etching | Sodium hydroxide 30–50 g/l Chelating agent Surfactant | 40–60 | 0.3–0.6 |
| Activation | 62% Nitric acid 500 ml/L Hydrofluoric acid 50 g/l | ambient temperature | 0.3–0.5 |
| Substitution with zinc | Sodium hydroxide Zinc | 20–25 | 0.3–0.6 |
| Dipping in nitric acid | 5% Nitric acid | ambient temperature | 0.5–1.0 |

B. Plating Processes

The plating is performed by means of immersing the target component as a cathode with an anode into plating solution and connecting the component and the anode directly to a power supply. When plating a target component with Fe or an Fe—Cr alloy, the plating conditions preferably are as shown in Table 6. Each value presented in Table 6 is a value obtained assuming that the desired thickness of an Fe layer and an Fe—Cr layer is 20 μm, while the Vickers scale hardness of the Fe layer is 300–400 while the hardness of the Fe—Cr layer is 600–700 on the Vickers scale.

TABLE 6

Condition of Metal Plating

| Conditions | Fe plating | | Fe—Cr plating | |
| --- | --- | --- | --- | --- |
| Composition of plating solution | Ferrous nitride | 250 g/l | Basic chromium sulfate | 120 g/l |
| | Ferrous chloride | 40 g/l | Ammonium formate | 55 g/l |
| | Ammonium chloride | 20 g/l | Ammonium oxalate | 10 g/l |
| | L-ascorbic acid | 3 g/l | Potassium chloride | 54 g/l |
| | Citric acid | 1.2 g/l | Boric acid | 40 g/l |
| | Water | Balance | Ferrous chloride | 40 g/l |
| | | | Water | Balance |
| Current density (A/dm$^2$) | 2 | | 5 | |
| Temperature (Degrees Centigrade) | 40–45 | | 40–45 | |
| Plating time (min) | 60 | | 35 | |
| Thickness of coating (μm) | 20 | | 20 | |
| Hardness (Hv) | 300–400 | | 600–700 | |

In order to vary the thickness of plated coating (i.e., make it large or smaller than 20 μm), the current density can be altered, and/or the plating period can be changed. Increased current density and/or increased plating periods will result in thicker plated coatings.

The target component can be masked over portions that need not, or should not, be plated. Once masked, the target component can be immersed into the plating solution. Over time, a layer of plating will then develop on the unmasked portions. For instance, on a brake disc, the portions of the brake disc not forming the friction surface could be masked such that they are not plated.

C. Wear Surface Cracking Processes i. Cracking by Thickness

Preferably, the plating is performed until the thickness of the plating layer generated on the target component becomes approximately 20 μm or more. By forming a plating layer thicker than at least 10 μm, cracks such as those illustrated in FIGS. 1 and 2 self-generate on the plating layer. Hence, no additional treatment is required to form the cracks. With reference to FIG. 1, when the thickness of the plating layer is about 10 μm, a diameter d of a circle inscribing to any individual piece of the plating layer, as defined by a set of cracks, becomes approximately 1.5 mm even if the individual piece were larger when initially formed. The subdivision results from inner stresses formed upon cooling and shrinking of the plating layer. In addition, because the extent of the cracking is partially dependent upon the thickness on the plating layer, the thicker the layer, the finer the network of cracks.

When the diameter d of the circle inscribing to a metal piece of the plating layer within cracks 15 is approximately 1.5 mm, even if it originally were larger, the piece of the plating layer defined by a set of adjacent cracks inhibits expansion of the underlying component to which the plating layer is bonded. Thus, where the sizes of the pieces of the plating layer are small, warping and bending of the underlying component can be reduced. The cracks absorb some of the expansion (as well as contraction) of the pieces of the plating layer. In addition, the large shear forces imposed on some components (i.e., brake discs) transfer into shear forces between the individual pieces of the plating and the underlying component. The small sizes of the individual pieces reduce that likelihood that the individual pieces can easily flake from the underlying component.

If thickness of the plating layer is more than about 20 μm, the occurrence of finer cracks in the plating layer arises through use of the plated component. For instance, during use of a break disc, even larger pieces of the plated surface fracture into smaller pieces. Accordingly, no special device or treatment is required for forming the network of cracks in the plated layer.

ii. Cracking by Heating

Figure 18:
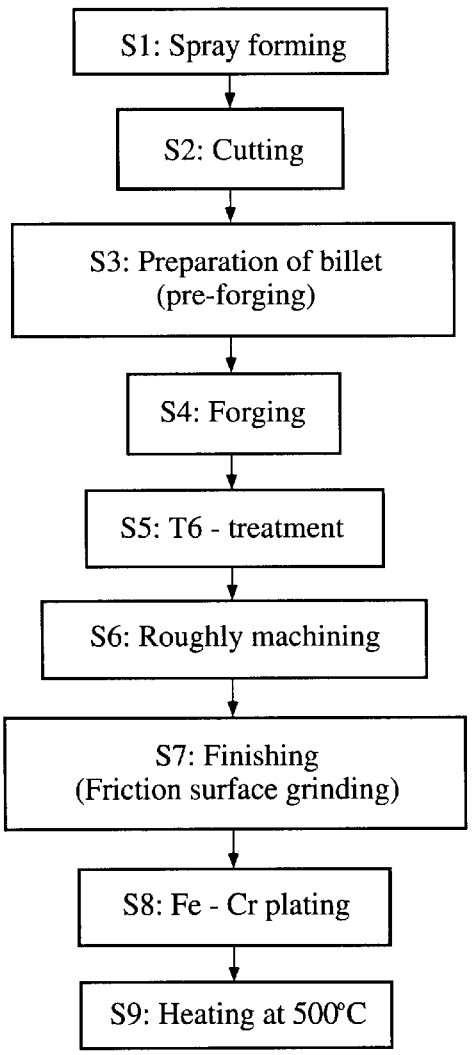
FIG. 18 is a flow diagram showing another process for manufacturing and plating a target component in which a network of cracks is formed by heating.

The cracks on the plating layer also can be formed in fine network by heating the plating layer after plating without using the heat generated during operation. With reference now to FIG. 18, a further process for providing an expandable wear surface will be described. First, the target component is formed in predetermined shape through processes, such as those illustrated as steps S1–S7 in FIG. 5. The pre-plating and plating step is then performed. As described above, the plating process desirably is performed in accordance with the conditions specified in Table 6. In addition to the Fe—Cr alloy, other metals such as Fe, Cr and Ni can be used as the plating layer metals.

Preferably, in this arrangement, the plating has a thickness of between about 10 and about 100 μm. While the plating method is virtually identical to that described directly above, finer network cracks are formed through the use of heat such that the plating layer can be made thinner while maintaining the desirable cracked configuration.

Figure 19:
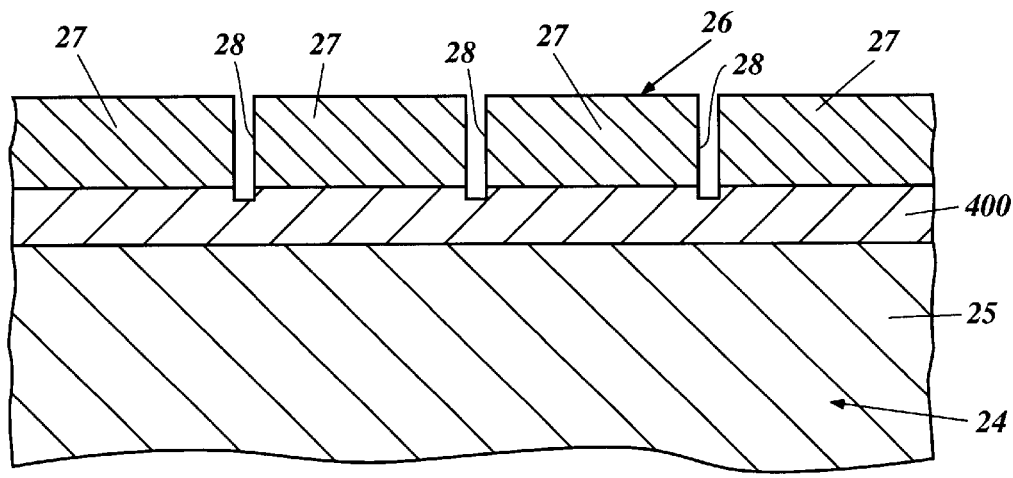
FIG. 19 is an enlarged sectioned view showing cracks formed in a plating layer with an intermediate layer formed between the plating layer and a substrate.

After completing the plating process, the component is heated for approximately 5 hours at about 500 degrees Centigrade, as shown at step S9 in FIG. 18. This heating is performed by inserting the target component into a heating furnace (not shown). Due to the heating of the plating layer in this heating process, fine network cracks 28 are formed in the plating layer 26, and, as shown in FIG. 19, a number of divided pieces 27 comprising the Fe—Cr alloy are formed on the plated wear surface 26 of the brake disc body 25.

According to this method, because the entire target component is heated, the entire component is thermally expanded at the uniform rate. In addition to the cracks 28 due to the inner stresses present during plating, cracks 28 also can be generated finely and uniformly such that a plated piece will not become a partially large piece. On this account, the size of inscribing circle of the plating layer piece likely does not vary widely.

To form finer crack networks, a heating temperature can be set to approximately 400° C. or above due to the difference between coefficients of thermal expansion of the base material (aluminum alloy) and the plating layer. As shown in the present embodiment, when heating temperature is set to 500° C., Fe or Cr atoms forming the plating layer is diffused to the base material, and atoms of the aluminum alloy are diffused into to the plating layer 52 so that a diffused layer as indicated with a reference numeral 400 is formed in between the plating 26 and the target component 24. Diffusion increases the adherence between the metal-based materials of the presently preferred structure. The diffused layer 400 can be formed in processing period of approximately 5 hours if the heating temperature is approximately 500° C. Furthermore, the thickness of the diffusion layer 17 is approximately 1–50 μm.

Furthermore, the diffusion rate exponentially increases in proportion to the processing temperature, so that if the temperature of 500° C. is lowered to be 400° C. or less, the diffusion rate decreases to below an acceptable level. At the sub-acceptable level, it takes too long to form the diffused layer 400. However, if the processing temperature is set to 600° C. or greater, the aluminum alloy target component becomes partly melted such that it is disadvantageous to use such temperatures in such applications.

Additionally, the target component (and the plated wear surface) can be heated by friction in some arrangements. For instance, where the target component is a brake disc, friction is created between the plated brake disc and a brake pad used to slow or stop rotational movement of the brake disc. Under these conditions, the friction increases the temperature of the brake disc. Under some circumstances, the friction increases the temperature of the brake disc to a sufficient degree to cause further fractioning of the plated wear surface.

iii. Cracking by Nitrosulphurization

Figure 20:
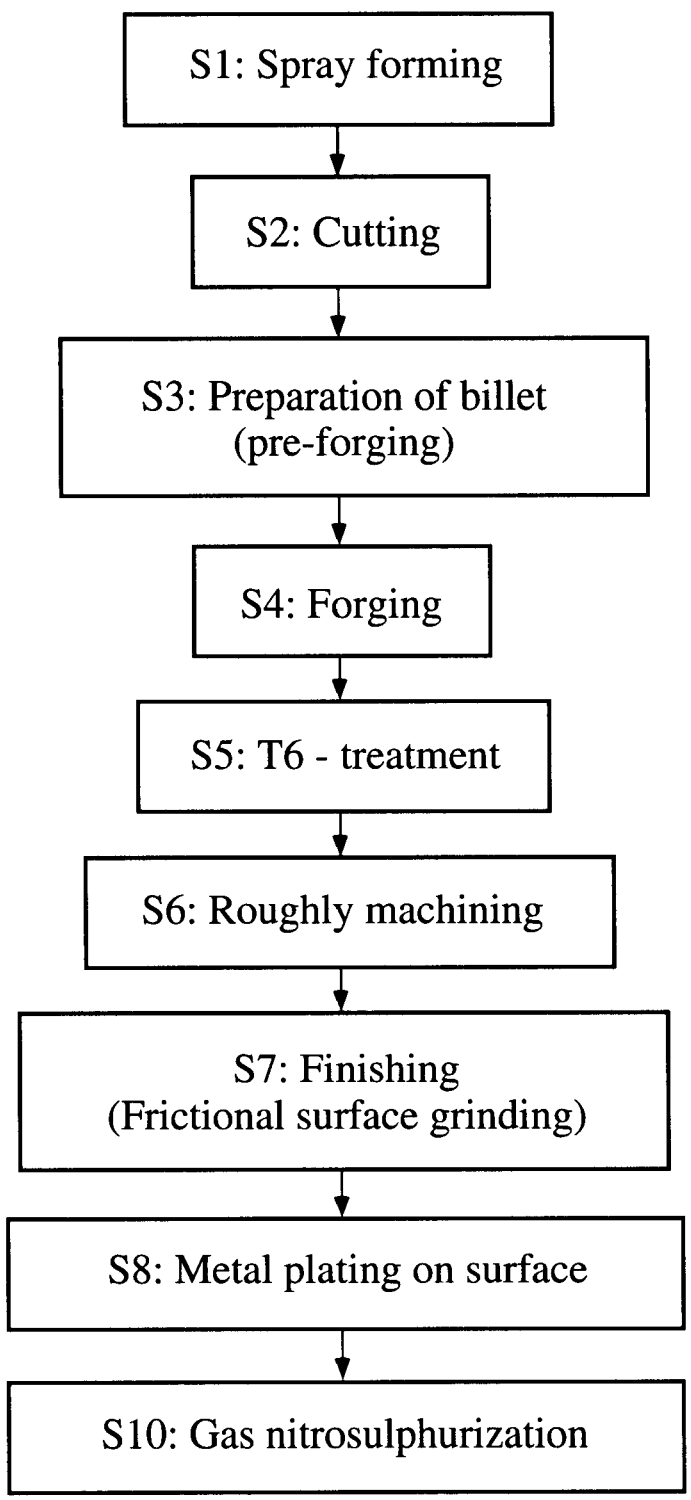
FIG. 20 is a flow diagram showing a process for manufacturing and plating a target component having an intermediate layer and a network of cracks, which network is formed in the plating layer by nitrosulphurization.

With reference now to FIG. 20, the cracks in the plating layer also can be formed in a network pattern by applying a nitrosulphurization process to the metal of the plating layer. As with the first two processes, first the target component is manufactured and a pre-plating process and a plating process are performed in steps S1–S8. In the illustrated process, an Fe—Cr alloy is used to create a highly wear-resistant metal. As will be recognized, Fe, Cr, and Ni also can be used in place of the Fe—Cr alloy.

Preferably, the plating of step S8 results in a plating layer thickness of between about 10 and about 100 μm. While the thickness of the plating layer 13 must be 20 μm or thicker in some processes, in the present process, the plating layer thickness can be thinner than 20 μm.

Following plating, a gas nitrosulphurization process is applied in the step S10. The gas nitrosulphurization process preferably is carried out under the gas nitrosulphurization conditions presented below in Table 7. Namely, it is carried out by heating the plated component in an oven of containing a mixture of $N_2$, $H_2S$, and $NH_3$. The heating temperature preferably is in the range of 500 degrees Centigrade±50 degrees Centigrade and the heating time is about 5 hours.

By using the nitrosulphurization process, the plating layer hardness can be increased. Additionally, as the plating layer is heated during the nitrosulphurization process, cracks of a network pattern are produced in the plating layer. Thus, a large number of small Fe—Cr alloy pieces are subdivided by the cracks. Each of the pieces has a higher hardness than those described above.

Because the nitrosulphurization process occurs at a high temperature, atoms of Fe or Cr, which form the plating layer, can be diffused among the atoms of the aluminum alloy forming the target component such that a diffusion layer 400 is formed between them. Accordingly, the adhesion strength of the plating layer is increased.

TABLE 7

| Conditions of Nitrosulphurization | |
| --- | --- |
| Temperature (Degrees Centigrade) | 500 ± 50 |
| Time (Hours) | 5 |
| Ambient | Gas mixture of $N_2$, $H_2S$ and $NH_3$ |
| Hardness of skin (Hv) | |
| Fe plating | 750 (700–800) |
| Fe—Cr plating | 1250 (1100–1350) |

When the gas nitrosulphurizing process is carried out under the conditions shown in Table 7, the Vickers scale hardness of the resulting Fe layer is approximately 750 (700–800) and the Vickers scale hardness of the resulting Fe—Cr layer is approximately 1250 (1100–1350).

Furthermore, instead of the gas nitrosulphurization process, a gas nitrizing process can be used if the component is heated to a temperature of approximately 500±50° C. for a period of about 5 hours. During such a gas nitrizing process, the environment contains a mixture of $N^2$ and $NH^3$.

iv. Cracking by Burnishing

Figure 21:
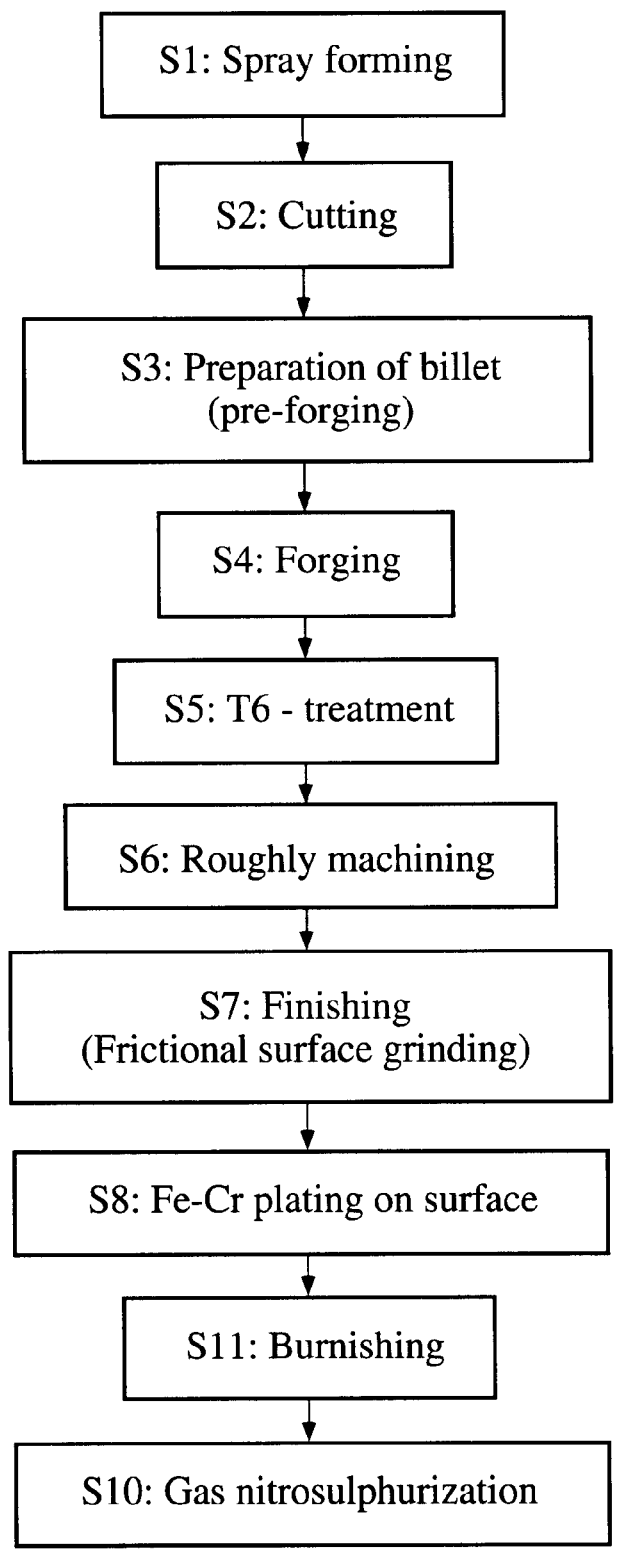
FIG. 21 is a flow diagram showing another process for manufacturing and plating a target component having an intermediate layer and a network of cracks, which network is formed in the plating layer by burnishing.

With reference now to FIG. 21, the cracks in the plating layer 26 can also be produced by a mechanical process such as burnishing. As with the first three processes, first the target component 24 is manufactured and a pre-plating process and a plating process are performed in steps S1–S8. In the illustrated process, an Fe—Cr alloy is used to create a highly wear-resistant metal. As will be recognized, Fe, Cr, and Ni also can be used in place of the Fe—Cr alloy.

Preferably, the plating of step S8 results in a plating layer 26 thickness of between about 10 and about 100 μm. While the thickness of the plating layer 26 must be 20 μm or thicker in some processes, in the present process, the plating layer thickness can be thinner than 20 μm.

After finishing the plating process, a burnishing process is applied in the step S11. The burnishing process is carried out with a roller (not shown) which is pressed against and rolled over the plated surface 13. By burnishing the plated component in this way, cracks 28 in are formed in the plating layer 26.

After burnishing, to increase the hardness of the plating layer 26 made of the Fe—Cr alloy, a gas nitrosulphurization process, step S10 in FIG. 20, can be applied to the plating layer 26. Using the gas nitrosulphurization process makes it possible not only to increase the hardness of the plating layer 26 but also to form the desired crack network. Moreover, using the process increases the adhesion strength of the plating layer 26 because a diffusion layer 400 is formed between the plating layer 26 and the target component 24. Preferably, the conditions of the gas nitrosulphurization process are as discussed above.

As will be recognized by those of ordinary skill in the art, a heating process can be used after burnishing to further refine the pattern of the cracks formed in the plating layer. For instance, the target component can be heated to a temperature of about 400° C. or higher. Moreover, when the target component is heated to a temperature of about 500° C., the diffusion layer 400 between the plating layer 26 and the target component 24 is efficiently formed in about 5 hours, and the adhesion strength of the plating layer 26 increases.

D. Intermediate Layer Plating

Figure 22:
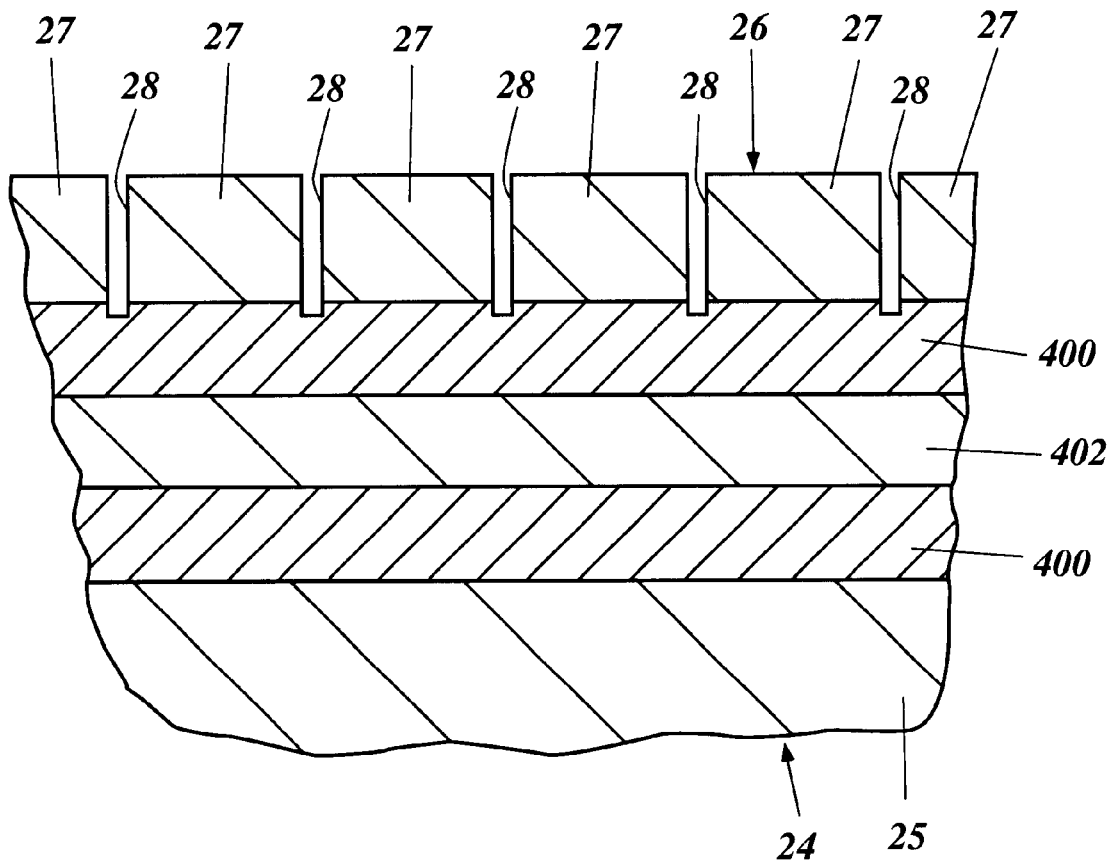
FIG. 22 is an enlarged sectioned view showing cracks formed in a plating layer with a corrosion-resistant intermediate layer formed between the plating layer and a substrate.
Figure 23:
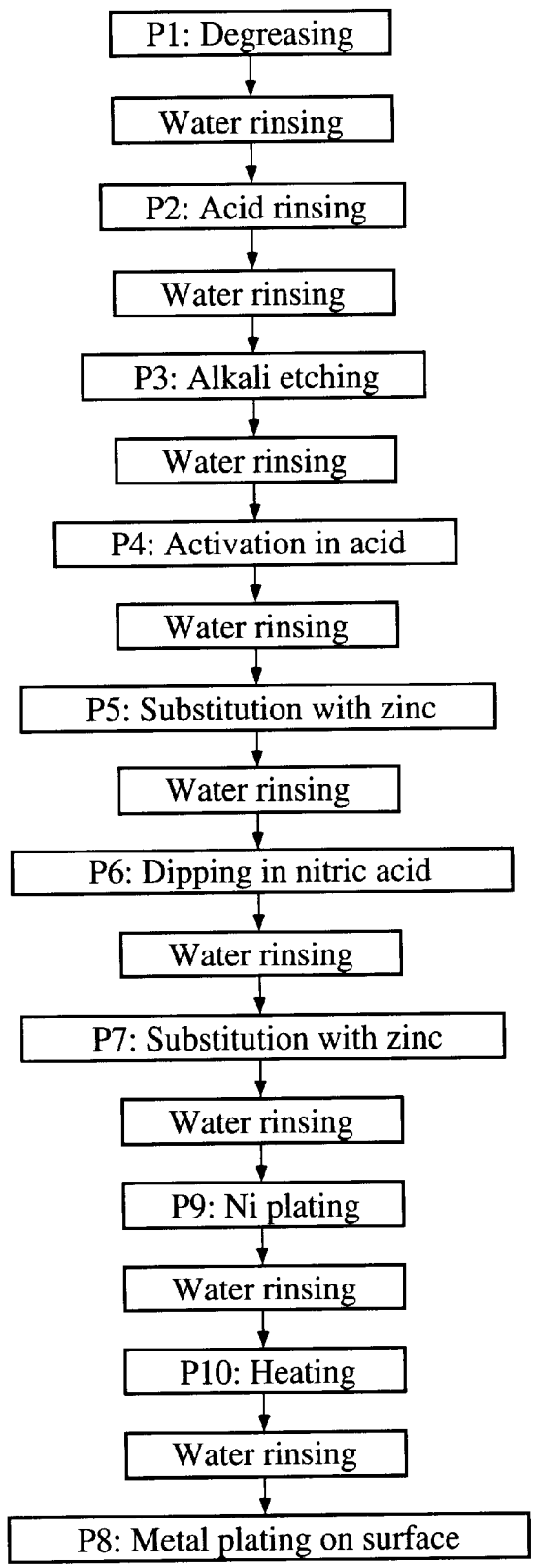
FIG. 23 is a flow diagram showing another process for manufacturing and plating a target component having a corrosion-resistant intermediate layer and a network of cracks, which network is formed in the plating layer.

With reference now to FIGS. 22 and 23, an intermediate plating layer 402 can be formed between the wear surface 26 and the target component 24. The metal for forming the intermediate layer 402 preferably is one such as Ni, which has a high corrosion resistance. Diffusion layers 400 can be formed between the intermediate layer 402 and the target component 24 and between the intermediate layer 400 and the wear surface plating layer 26.

As with the first four processes, first the target component 24 is manufactured and a pre-plating process. The target component 24 is then plated with Ni in the step P9. The Ni plating process can use the same plating apparatus used for forming the wear surface plating layer 26 on the outside surface of the target component. Thus, the plating conditions are substantially the same as those for forming the wear surface plating layer 26.

When the Ni plating step P9 has been completed, the component is rinsed with water, and then heated in a step P10 to form a diffusion layer 400 between the Ni plating layer 402 and the component 24. Also, in the illustrated process, the heating temperature preferably is set to about 500 degrees Centigrade or higher. As the diffusion layer 400 is formed, the adhesion strength of the Ni plating layer 402 increases.

The thickness of the intermediate layer 402 is preferably within the range of 0.1 to 5 μm for corrosion resistance and need not be any thicker than that when Ni is used as the material for plating. Reducing the plating thickness advantageously makes it possible to prevent cracks from being produced within the intermediate layer 402 during the plating process. Because the thermal expansion coefficient of Ni is about the same as that of the aluminum alloys, less thermal stresses are produced at the interface between the Ni and the aluminum alloys. Therefore, forming the intermediate layer 402 does not cause the target component (i.e., brake disc) to warp or deflect, nor does it cause the wear surface plating layer 26 to delaminate from the target component 24. Thus, cracks are less likely to occur at this interface than the interface between the aluminum alloys and the wear surface plating materials.

After heating, plating is applied in the step P8 to form the wear surface plating layer 26 from a highly wear-resistant material such as Fe, Fe—Cr, or Cr. Of course, the wear surface 26 is disposed on the outside surface of the Ni plating layer 402. Desirably, the plating conditions for the Ni layer 402 and for the wear surface layer 26 are the same as those described above.

Forming the internal intermediate plating layer of Ni 402, or of another material featuring high corrosion resistance, as shown in this arrangement makes it possible to prevent water entering through the cracks 28 in the outside plated surface 26 from coming into contact with the aluminum alloy 25 target component 24. As a result, the target component 24 is substantially protected from corrosion even if the component is wetted with rainwater or the like. This corrosion resistance also further reduces the likelihood of separation between the wear surface plating layer 26 and the intermediate layer 402. Furthermore, since both the wear surface plating layer 26 and the intermediate plating layer 402 are deposited by plating, two kinds of metallic layers can be applied to a single target component 24 using a single plating apparatus, so that the manufacturing cost is held low.

Of course, the foregoing description is that of certain features, aspects and advantages of the present invention to which various changes and modifications may be made without departing from the spirit and scope of the present invention. Moreover, a process or target component need not feature all objects of the present invention to use certain features, aspects and advantages of the present invention. The present invention, therefore, should only be defined by the appended claims.

What is claimed is:

1. A method of forming an expandable wear surface on an aluminum alloy component, the method comprising preparing said aluminum alloy component, plating said component with a layer of a wear resistant material, and forming a network of cracks through said layer of said wear resistant material, a plurality of said cracks extending entirely through said layer of said wear resistant material, said network of cracks reducing said layer to multiple fragments to allow relative thermal expansion between individual fragments.

2. The method of claim 1, wherein said multiple fragments each have an inscribed circle with a diameter of less than about 1.5 millimeters.

3. The method of claim 1 further comprising forming said aluminum alloy component into a brake disc.

4. The method of claim 1 further comprising forming said aluminum alloy component into a tappet.

5. The method of claim 1 further comprising forming said aluminum alloy component into a rocker arm.

6. The method of claim 1 further comprising forming said aluminum alloy component into a piston.

7. The method of claim 1 further comprising forming said aluminum alloy component into a connecting rod.

8. The method of claim 1, wherein said preparing said aluminum alloy component involves a pre-plating procedure.

9. The method of claim 8, wherein said pre-plating procedure comprises degreasing and acid etching said aluminum alloy component.

10. The method of claim 1, wherein said network of cracks is formed after said plating process is completed.

11. The method of claim 1, wherein said network of cracks is formed by plating said component with a layer of said wear resistant material having a sufficient thickness to induce cracking.

12. The method of claim 1, wherein said network of cracks is formed when said layer of said wear resistant material is plated to a sufficient thickness to induce cracking.

13. The method of claim 10, wherein said wear resistant material is an Fe alloy and said sufficient thickness is more than about 20 micrometers.

14. The method of claim 10, wherein said wear resistant material is an Fe—Cr alloy and said sufficient thickness is more than about 20 micrometers.

15. The method of claim 1, wherein said network of cracks is formed by applying a thermal load to said aluminum alloy component and said layer of wear resistant material.

16. The method of claim 15, wherein said thermal load is friction induced.

17. The method of claim 15, wherein said thermal load occurs in a heat treating process.

18. The method of claim 17, wherein said heat treating process involves heating said component to a temperature of about 500 degrees Centigrade for about 5 hours.

19. The method of claim 17, wherein said thermal load occurs in a surface hardening process.

20. The method of claim 19, wherein said surface hardening process is a nitrosulfurization process.

21. The method of claim 20, wherein said wear resistant layer has a thickness of between about 10 micrometers and 100 micrometers.

22. The method of claim 15, wherein said wear resistant layer and said aluminum alloy at least partially diffuse together when said thermal load is applied.

23. The method of claim 1, wherein said network of cracks is formed by burnishing.

24. The method of claim 23, wherein said network of cracks formed by burnishing is refined by applying heat sufficient to create a diffusion layer between said wear resistant layer and said aluminum alloy component.

25. The method of claim 24, wherein said heat is applied during a nitrosulfurization process.

26. The method of claim 1, further comprising forming an anticorrosive intermediate layer over said aluminum alloy component before plating said layer of a wear resistant material, wherein said layer of wear resistant material is plated over said anticorrosive intermediate layer.

27. The method of claim 1, wherein said step of forming said intermediate layer involves depositing.

28. The method of claim 1, wherein said wear resistant material is metallic.

29. An aluminum alloy part having a plated wear resistant surface, said part comprising an aluminum alloy substrate and a plated wear resistant surface covering at least a portion of said substrate, said wear resistant surface having a plurality of wear resistant surface fragments that are separated from one another by cracks that extend entirely through said plated wear resistant surface, said cracks forming a network of cracks that allow relative thermal expansion between individual fragments.

30. A part as recited in claim 29, wherein said network of cracks completely covers said wear resistant surface.

31. A part as recited in claim 29, further comprising an anticorrosive intermediate layer being disposed between said plated wear resistant surface covering and said aluminum alloy substrate.

32. A part as recited in claim 29, wherein said wear resistant surface is metallic.

33. A part as recited in claim 29, wherein said fragments have an inscribed diameter of less than about 1.5 mm.

34. A part as recited in claim 29, wherein said substrate is tappet of a valve actuating mechanism for an engine.

35. A part as recited in claim 34, wherein said wear resistant surface is formed on at least one of a recess at a top of said tappet and an outer peripheral surface of said tappet.

36. A part as recited in claim 29, wherein said substrate is a rocker arm of a valve actuating mechanism for an engine.

37. A part as recited in claim 36, wherein said wear resistant surface is formed on at least one of a surface that is contacted by a valve actuating cam and a surface on which the rocker arm is mounted to a rocker arm shaft.

38. A part as recited in claim 29, wherein said substrate is a piston for an engine.

39. A part as recited in claim 38, wherein said wear resistant surface is formed on at least one of a piston pin bore and an outer peripheral surface of said piston.

40. A part as recited in claim 29, wherein said substrate is a connecting rod for an engine having a small end bore and a big end bore.

41. A part as recited in claim 40, wherein said wear resistant surface is formed in at least one of said small end bore and said big end bore.

42. An aluminum alloy part having a plated wear resistant surface, said part comprising an aluminum alloy substrate and a plated wear resistant surface covering at least a portion of said substrate, an anticorrosive intermediate layer being disposed between said plated wear resistant surface covering and said aluminum alloy substrate, said wear resistant surface having a plurality of wear resistant surface fragments that are separated from one another by cracks, said cracks forming a network of cracks, wherein said fragments have an inscribed diameter of less than about 1.5 mm.

43. A part as recited in claim 42, wherein said substrate is tappet of a valve actuating mechanism for an engine.

44. A part as recited in claim 43, wherein said wear resistant surface is formed on at least one of a recess at a top of said tappet and an outer peripheral surface of said tappet.

45. A part as recited in claim 42, wherein said substrate is a rocker arm of a valve actuating mechanism for an engine.

46. A part as recited in claim 45, wherein said wear resistant surface is formed on at least one of a surface that is contacted by a valve actuating cam and a surface on which the rocker arm is mounted to a rocker arm shaft.

47. A part as recited in claim 42, wherein said substrate is a piston for an engine.

48. A part as recited in claim 47, wherein said wear resistant surface is formed on at least one of a piston pin bore and an outer peripheral surface of said piston.

49. A part as recited in claim 42, wherein said substrate is a connecting rod for an engine having a small end bore and a big end bore.

50. A part as recited in claim 49, wherein said wear resistant surface is formed in at least one of said small end bore and said big end bore.

51. An aluminum alloy part having a plated wear resistant surface, said part comprising an aluminum alloy substrate and a plated wear resistant surface covering at least a portion of said substrate, an anticorrosive intermediate layer being disposed between said plated wear resistant surface covering and said aluminum alloy substrate, said wear resistant surface having a plurality of wear resistant surface fragments that are separated from one another by cracks, said cracks forming a network of cracks, wherein said wear resistant surface is plated from a material comprising an iron constituent.

52. A part as recited in claim 51, wherein said material of said wear resistant surface has a hardness increased by the penetration of a nitrogen component.

53. A part as recited in claim 52, wherein the nitrogen component comprises a nitrogen and sulfur mixture.

54. A brake disc comprising an aluminum alloy substrate and a plated wear resistant surface covering at least a portion of said substrate, said wear resistant surface having a plurality of wear resistant surface fragments that are separated from one another by cracks that extend entirely through said wear resistant surface, said cracks forming a network of cracks that allow relative thermal expansion between individual fragments.

55. The brake disc of claim 54, wherein said network of cracks completely covers said wear resistant surface.

56. The brake disc of claim 54, further comprising an intermediate layer of anticorrosive material positioned between said substrate and said wear resistant surface.

57. The brake disc of claim 54, wherein said wear resistant surface is metallic.

58. The brake disc of claim 54, wherein said fragments have an inscribed diameter of less than about 1.5 mm.

59. The brake disc of claim 54 in combination with a set of brake pads, wherein said brake disc is disposed between a set of brake pads, said plated wear resistant surface substantially covering a frictional surface that is selectively engageable with said set of brake pads.

60. The brake disc and brake pad combination of claim 59, wherein each of said set of brake pads is formed of a material having a hardness lower than that of the plated wear resistant surface.

61. The brake disc and brake pad combination of claim 59, wherein at least one of said set of brake pads is formed of a synthetic resin material.

62. The brake disc and brake pad combination of claim 59, wherein at least one of said set of brake pads is formed of a Cu-containing sintered material.

63. A brake disc comprising an aluminum alloy substrate and a plated wear resistant surface covering at least a portion of said substrate, an intermediate layer of anticorrosive material positioned between said substrate and said wear resistant surface, said wear resistant surface having a plurality of wear resistant surface fragments that are separated from one another by cracks, said cracks forming a network of cracks, wherein said fragments have an inscribed diameter of less than about 1.5 mm.

64. The brake disc of claim 63 in combination with a set of brake pads, wherein said brake disc is disposed between a set of brake pads, said plated wear resistant surface substantially covering a frictional surface that is selectively engageable with said set of brake pads.

65. The brake disc and brake pad combination of claim 64, wherein each of said set of brake pads is formed of a material having a hardness lower than that of the plated wear resistant surface.

66. The brake disc and brake pad combination of claim 64, wherein at least one of said set of brake pads is formed of a synthetic resin material.

67. The brake disc and brake pad combination of claim 64, wherein at least one of said set of brake pads is formed of a Cu-containing sintered material.

68. A method of forming a brake disc having an expandable wear surface, the method comprising forging an aluminum alloy brake disc body from a brake disc blank, pretreating said brake disc body to prepare said brake disc body for an electroplating process, plating said brake disc body with a layer of wear resistant material, and forming a network of cracks that extend entirely through said layer of wear resistant material, said network of cracks creating multiple fragments in said layer of wear resistant material to allow relative thermal expansion between individual fragments.

69. The method of claim 68, wherein said brake disc body comprises an aluminum material or an aluminum alloy material.

70. The method of claim 69, wherein said aluminum alloy material comprises an Fe component and a Zr component.

71. The method of claim 70 further comprising heat treating said plated brake disc body.

72. The method of claim 68, further comprising forming an anticorrosive intermediate layer on said brake disc body, wherein said layer of wear resistant material is plated over said anticorrosive intermediate layer.

73. The method of claim 68, wherein said layer of wear resistant material is metallic.

74. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said multiple fragments each have an inscribed circle with a diameter of less than about 1.5 millimeters.

75. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said network of cracks is formed after said plating process is completed, and wherein said wear resistant material is an Fe alloy having a thickness of more than about 20 micrometers.

76. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said network of cracks is formed after said plating process is completed, and wherein said wear resistant material is an Fe—Cr alloy having a thickness of more than about 20 micrometers.

77. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said network of cracks is formed by applying a thermal load to said aluminum alloy component and said layer of wear resistant material, wherein said thermal load is friction induced.

78. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said network of cracks is formed by applying a thermal load to said aluminum alloy component and said layer of wear resistant material, wherein said thermal load occurs in a heat treating process, wherein said heat treating process involves heating said component to a temperature of about 500 degrees Centigrade for about 5 hours.

79. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said network of cracks is formed by applying a thermal load to said aluminum alloy component and said layer of wear resistant material, wherein said thermal load occurs in a heat treating process, wherein said thermal load occurs in a surface hardening process.

80. The method of claim 79, wherein said surface hardening process is a nitrosulfurization process.

81. The method of claim 80, wherein said wear resistant layer has a thickness of between about 10 micrometers and 100 micrometers.

82. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said network of cracks is formed by burnishing.

83. The method of claim 82, wherein said network of cracks formed by burnishing is refined by applying heat sufficient to create a diffusion layer between said wear resistant layer and said aluminum alloy component.

84. The method of claim 83, wherein said heat is applied during a nitrosulfurization process.

85. A method of forming an expandable wear surface on an aluminum alloy component, the method comprising preparing said aluminum alloy component, forming an anticorrosive intermediate layer over said aluminum alloy component, plating said component with a layer of a wear resistant material over said anticorrosive intermediate layer, and forming a network of cracks through said layer of said wear resistant material, said network of cracks reducing said layer to multiple fragments, wherein said step of forming said intermediate layer involves depositing.

86. A method of forming an expandable wear surface on an aluminum alloy component, the method comprising:

preparing said aluminum alloy component;

electroplating said component with a layer of a wear resistant material; and forming a network of cracks extending at least partially through said layer of said wear resistant material, said network of cracks comprising multiple fragments, wherein each fragment has an interstitial size defined generally as a diameter of a circle that is inscribed between the cracks defining any single fragment, the diameter of said circle being less than about 1.5 millimeters.

87. An aluminum alloy part, comprising:

an aluminum alloy substrate; and an electroplated wear resistant surface covering at least a portion of said substrate, said wear resistant surface having a plurality of wear resistant surface fragments that are separated from one another by cracks that extend at least partially through said plated wear resistant surface, wherein each fragment has an interstitial size defined generally as a diameter of a circle that is inscribed between the cracks defining any single fragment, the diameter of said circle being less than about 1.5 millimeters.

* * * * *